US012658997B2

(12) United States Patent     (10) Patent No.:   US 12,658,997 B2

Chung et al.       (45) Date of Patent:    Jun. 16, 2026

(54) METHOD FOR TRANSMITTING AND RECEIVING CSI IN WIRELESS COMMUNICATION SYSTEM, AND DEVICE THEREFOR

(71) Applicant: LG Electronics Inc., Seoul (KR)

(72) Inventors: Jaehoon Chung, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 18/286,924

(22) PCT Filed: Apr. 12, 2022

(86) PCT No.: PCT/KR2022/005269

§ 371 (c)(1),
(2) Date: Oct. 13, 2023

(87) PCT Pub. No.: WO2022/220538

PCT Pub. Date: Oct. 20, 2022

(65) Prior Publication Data

US 2024/0187064 A1     Jun. 6, 2024

(30) Foreign Application Priority Data

Apr. 13, 2021    (KR) ........................ 10-2021-0048053

(51) Int. Cl.
*H04B 7/06*       (2006.01)
*H04L 5/00*       (2006.01)

(52) U.S. Cl.
CPC ......... *H04B 7/0626* (2013.01); *H04L 5/0048* (2013.01)

(58) Field of Classification Search
None
See application file for complete search history.

(56) References Cited

U.S. PATENT DOCUMENTS

2019/0349122 A1* 11/2019 Nam .................... H04L 25/0226
2019/0393989 A1* 12/2019 Jung ..................... H04W 24/02
2021/0028843 A1* 1/2021 Zhou ..................... H04B 7/063
(Continued)

OTHER PUBLICATIONS

Huawei, HiSilicon, "Enhancements on multi-beam operation," 3GPP TSG RAN WG1 Meeting #104bis-e, R1-2102333, E-meeting, Apr. 12-20, 2021, 15 pages.

(Continued)

*Primary Examiner* — Phirin Sam
(74) *Attorney, Agent, or Firm* — Fish & Richardson P.C.

(57)        ABSTRACT

The present disclosure provides a method of transmitting and receiving channel state information (CSI) and a device therefor in a wireless communication system. The method performed by a UE may comprise receiving CSI resource configuration related information from a BS, the CSI resource configuration related information including information for one or more CSI-RS resource sets, and at least one CSI-RS resource included in the one or more CSI-RS resource sets being configured to be applied with a joint TCI state; receiving, from the BS, mapping information on a mapping between the at least one CSI-RS resource and a channel or an RS for the joint TCI state; and changing a first QCL RS of a TCI state for the at least one CSI-RS resource to a second QCL RS of a TCI state of the channel or the RS.

13 Claims, 17 Drawing Sheets

(56) References Cited

U.S. PATENT DOCUMENTS

| | | | | |
|---|---|---|---|---|
| 2021/0037532 | A1 | 2/2021 | Nam et al. | |
| 2021/0258809 | A1* | 8/2021 | Gao | H04L 5/0051 |
| 2022/0140878 | A1* | 5/2022 | Zhu | H04B 7/0404 |
| | | | | 370/252 |
| 2022/0173785 | A1* | 6/2022 | Venugopal | H04B 7/0695 |
| 2022/0264324 | A1* | 8/2022 | Guo | H04W 74/0841 |
| 2022/0312433 | A1* | 9/2022 | Guo | H04B 17/336 |
| 2023/0189020 | A1* | 6/2023 | Calcev | H04W 74/0866 |
| | | | | 370/329 |
| 2023/0198601 | A1* | 6/2023 | Kang | H04L 5/005 |
| | | | | 370/329 |
| 2023/0379951 | A1* | 11/2023 | Khoshnevisan | H04W 72/0446 |
| 2024/0187187 | A1* | 6/2024 | Jung | H04L 5/0051 |
| 2024/0259067 | A1* | 8/2024 | Kwak | H04L 5/0094 |
| 2024/0349375 | A1* | 10/2024 | Park | H04L 5/0094 |
| 2025/0254009 | A1* | 8/2025 | Frenne | H04L 5/0051 |
| 2025/0261205 | A1* | 8/2025 | Kang | H04L 5/0023 |

OTHER PUBLICATIONS

LG Electronics, "Enhancements on Multi-beam Operation," 3GPP TSG RAN WG1 #104bis-e, R1-2103504, e-Meeting, Apr. 12-20, 2021, 16 pages.

Oppo, "Enhancements on Multi-Beam Operation," 3GPP TSG RAN WG1 #104b-e, R1-2102378, e-Meeting, Apr. 12-20, 2021, 20 pages.

Sony, "Further enhancement on multi-beam operation," 3GPP TSG RAN WG1#104bis, R1-2103287, E-meeting, Apr. 12-20, 2021, 20 pages.

* cited by examiner

【FIG. 1】
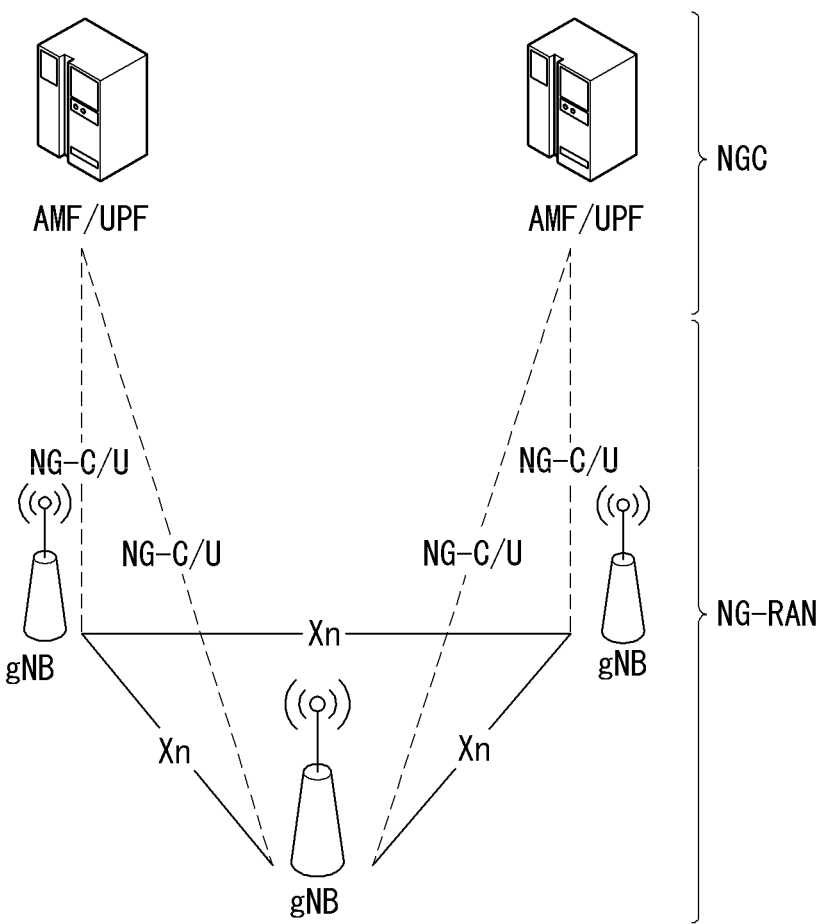
【FIG. 2】
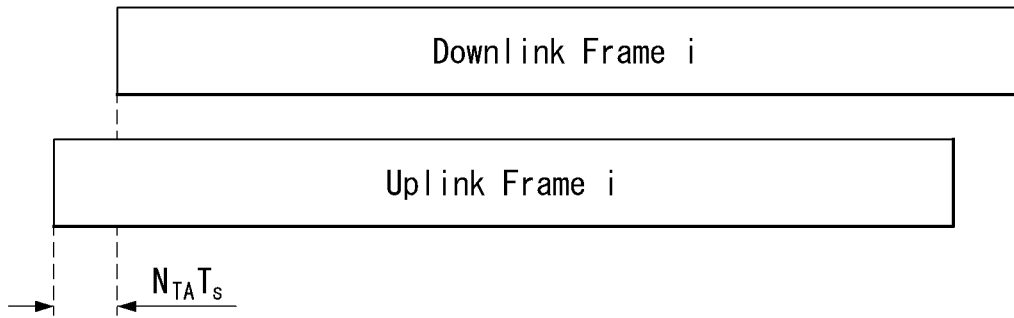

【FIG. 3】
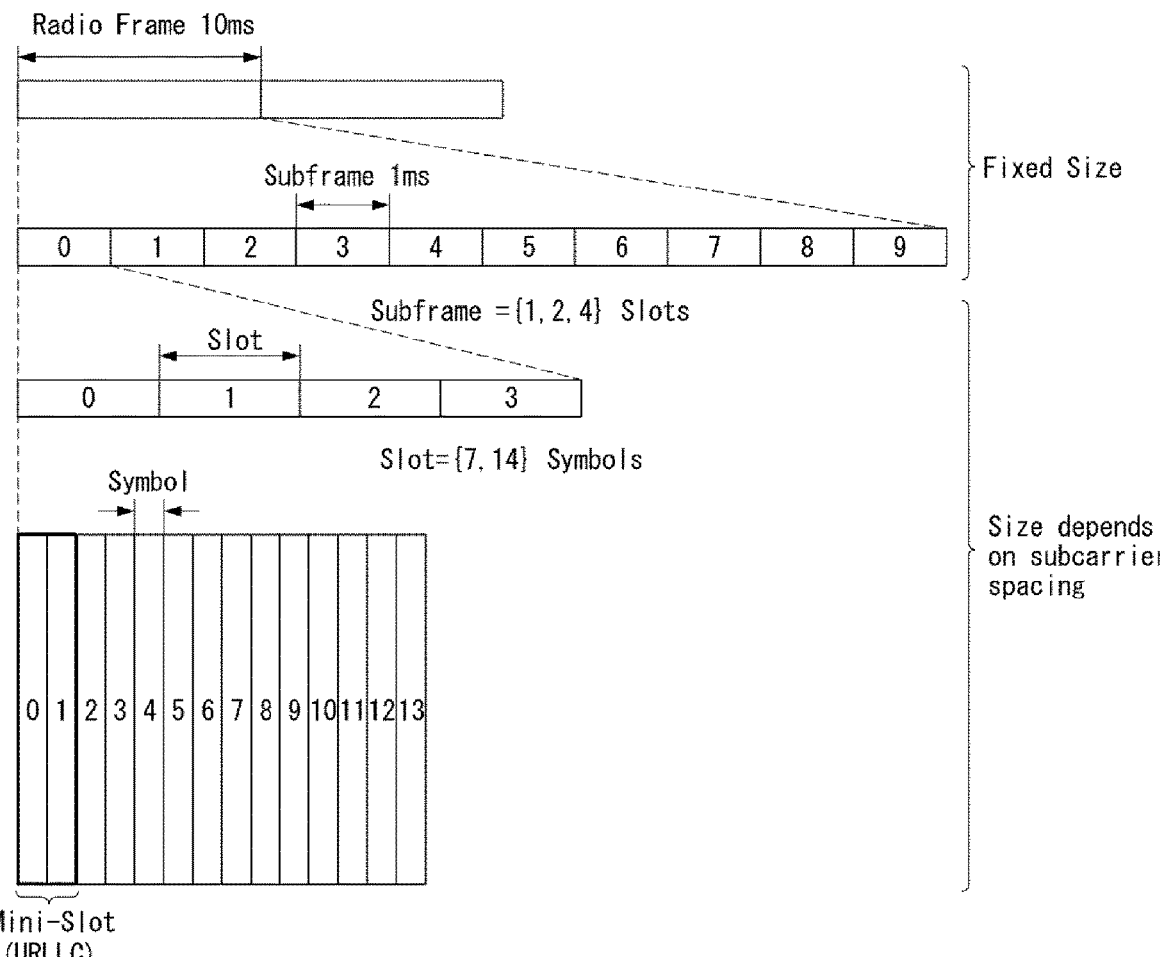

【FIG. 4】
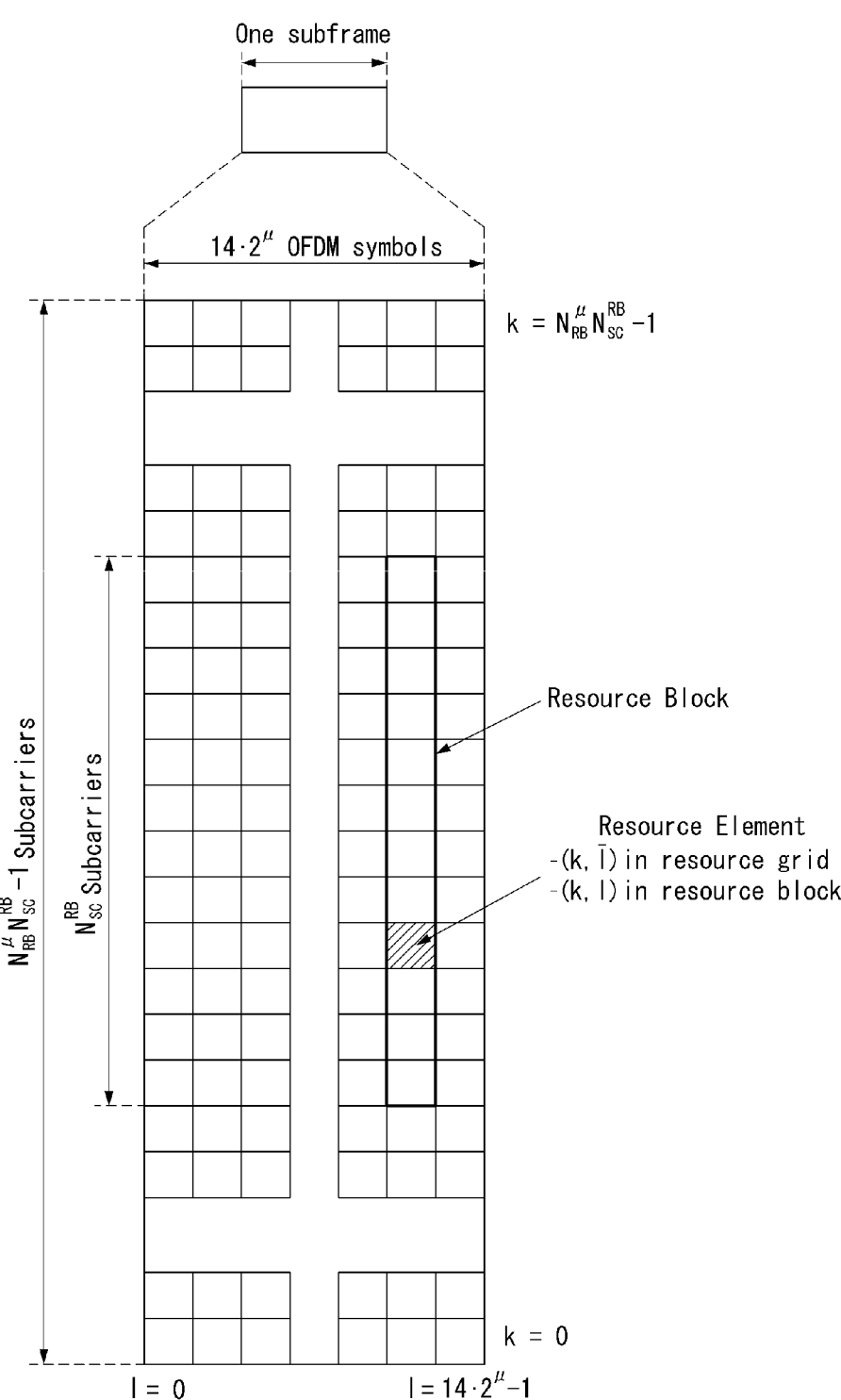

【FIG. 5】
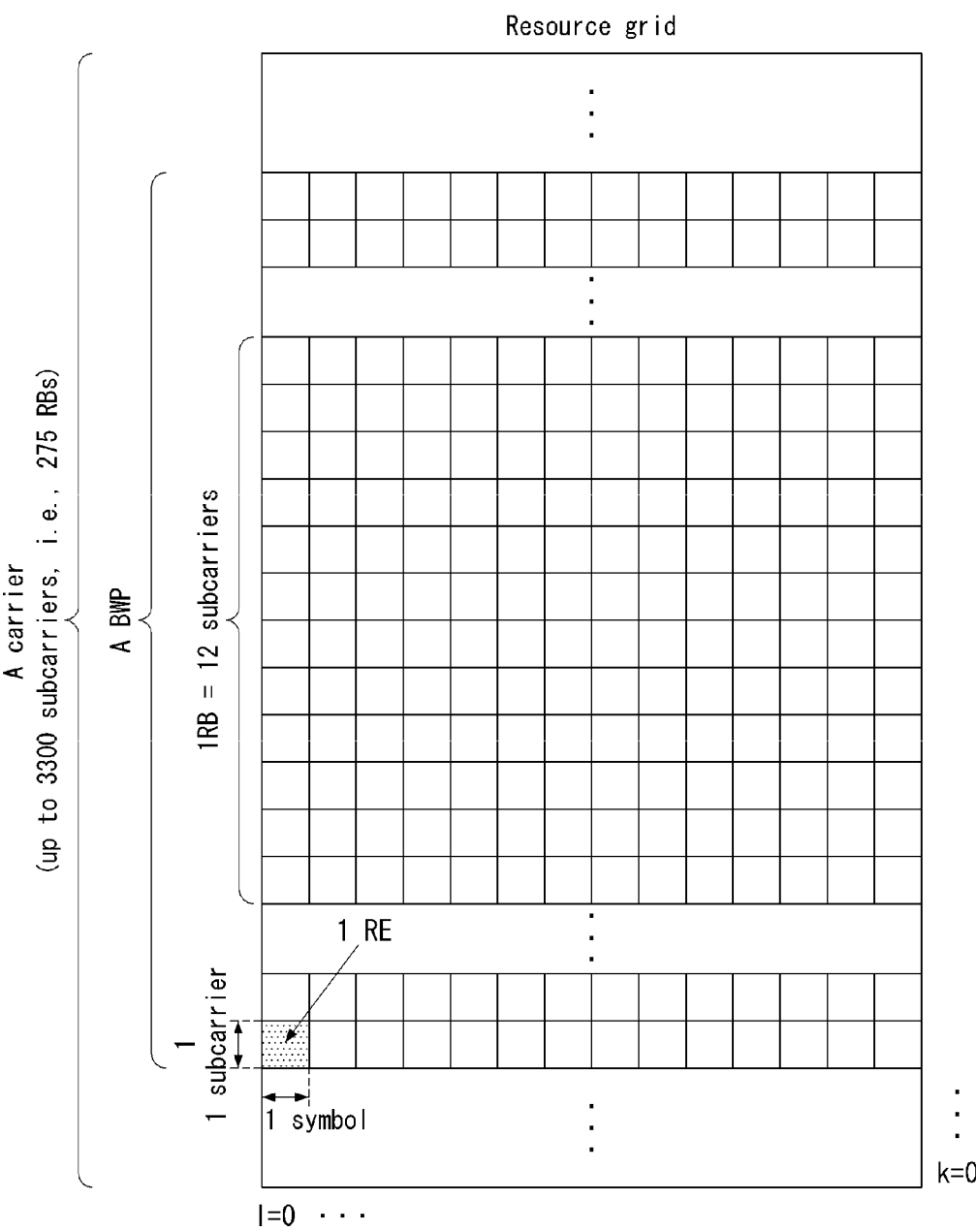

【FIG. 6】
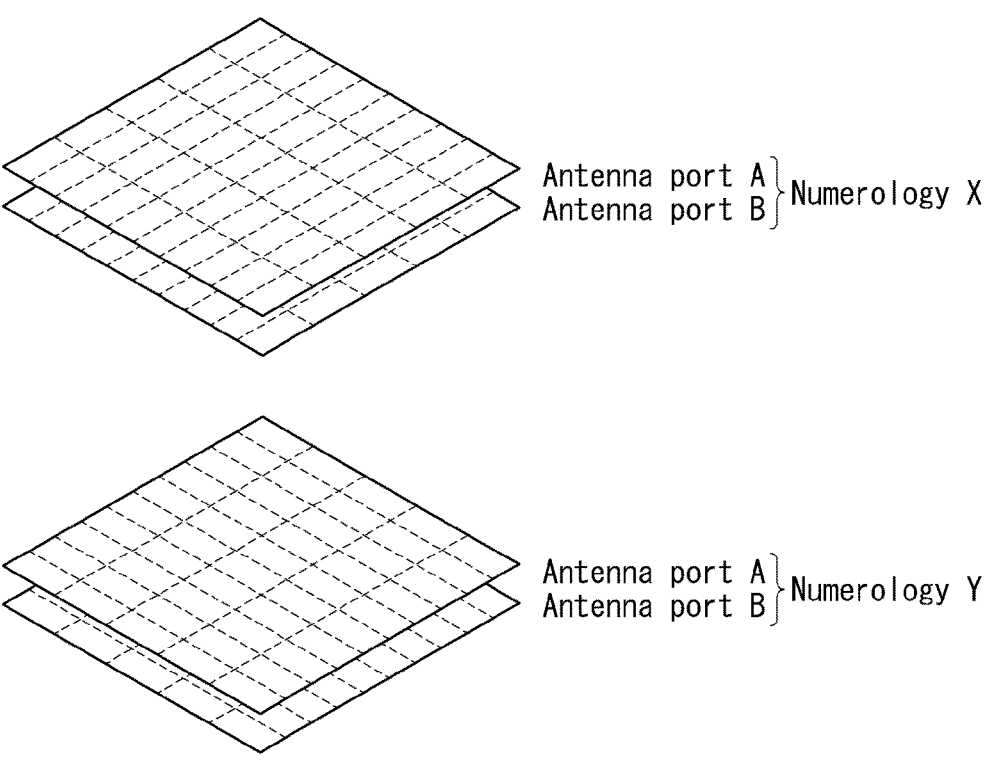
Antenna port A ⎫
Antenna port B ⎬ Numerology X
Antenna port A ⎫
Antenna port B ⎬ Numerology Y
【FIG. 7】
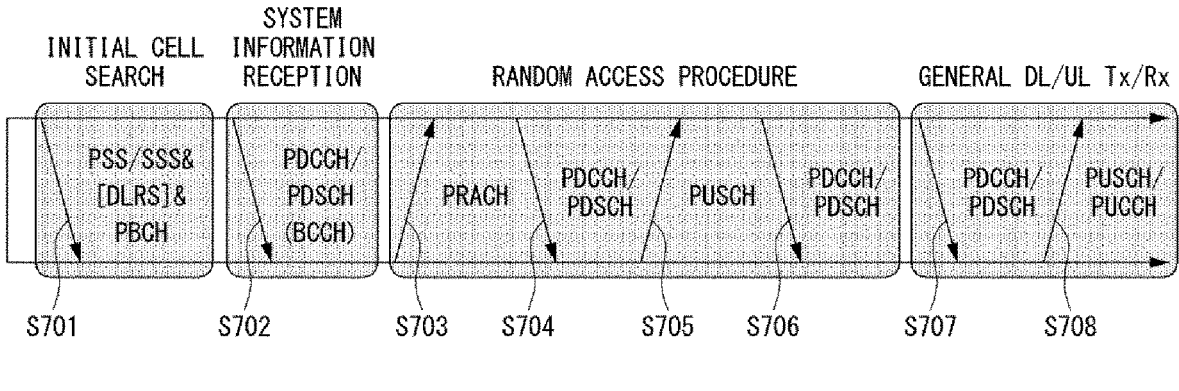
- DL/UL ACK/NACK
- UE CQI/PMI RI REPORT
  USING PUSCH AND PUCCH

[FIG. 8]
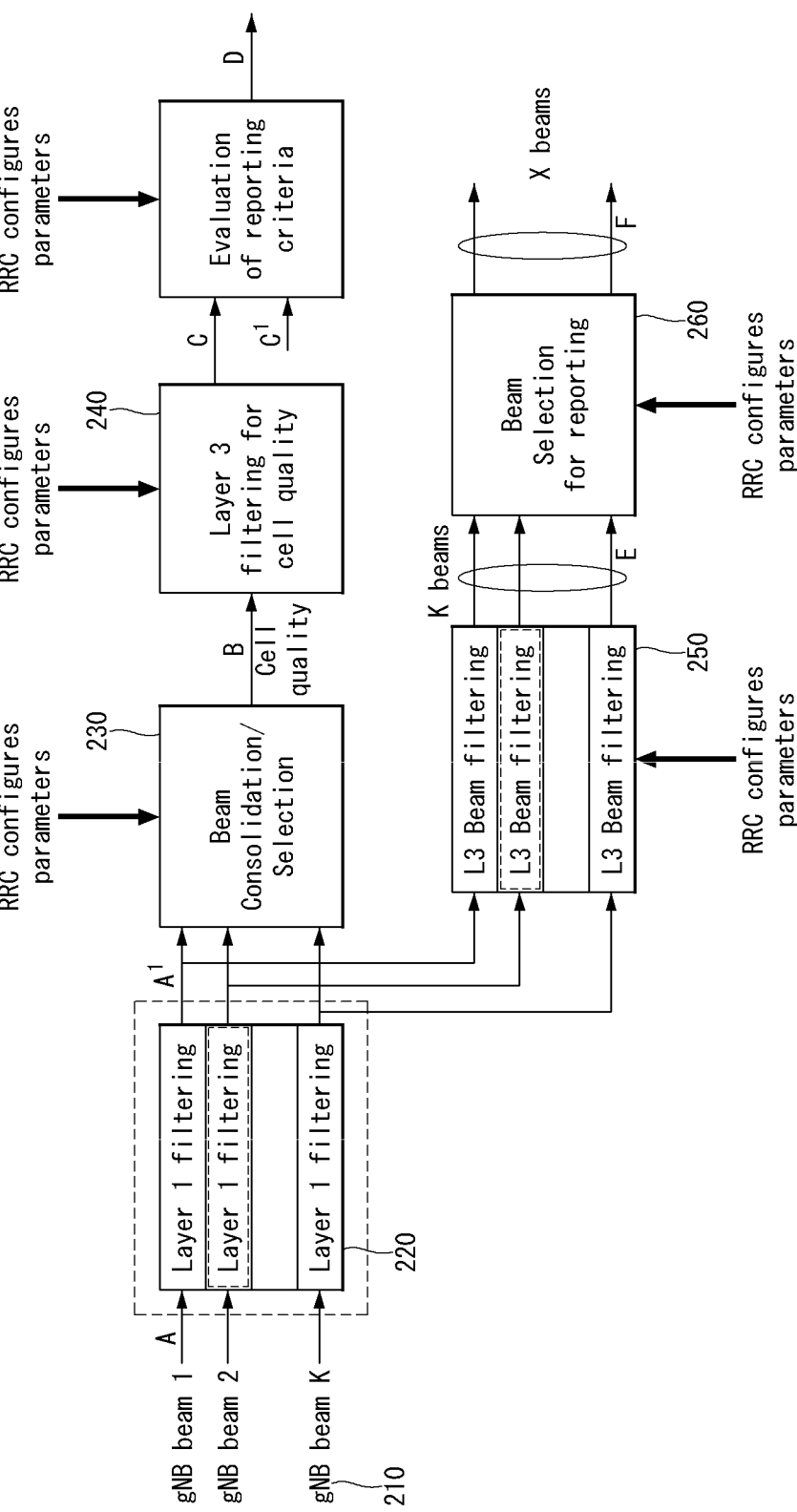

【FIG. 9】
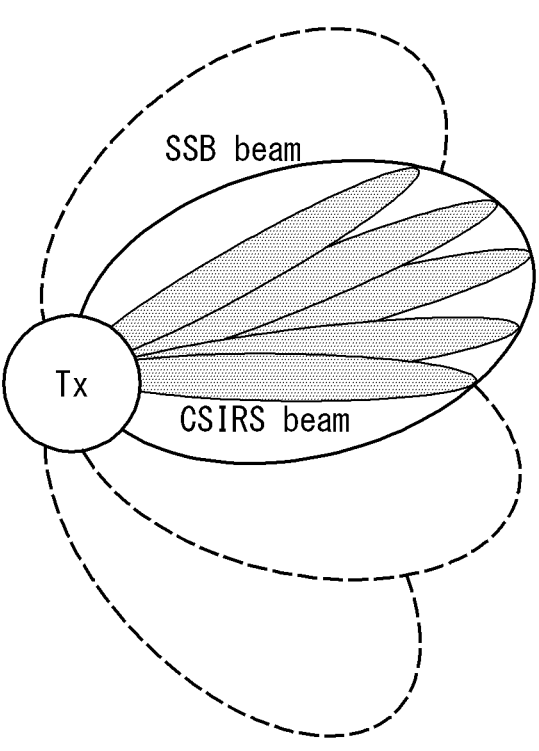
【FIG. 10】
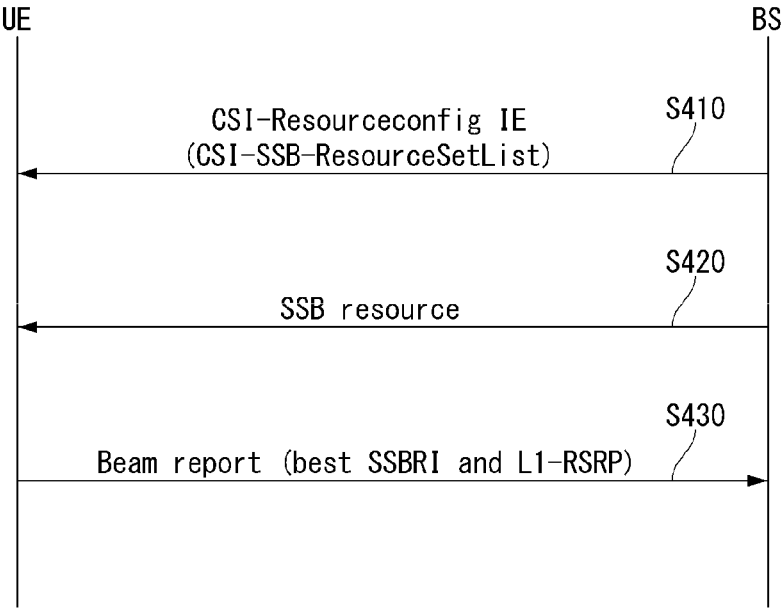

【FIG. 11】
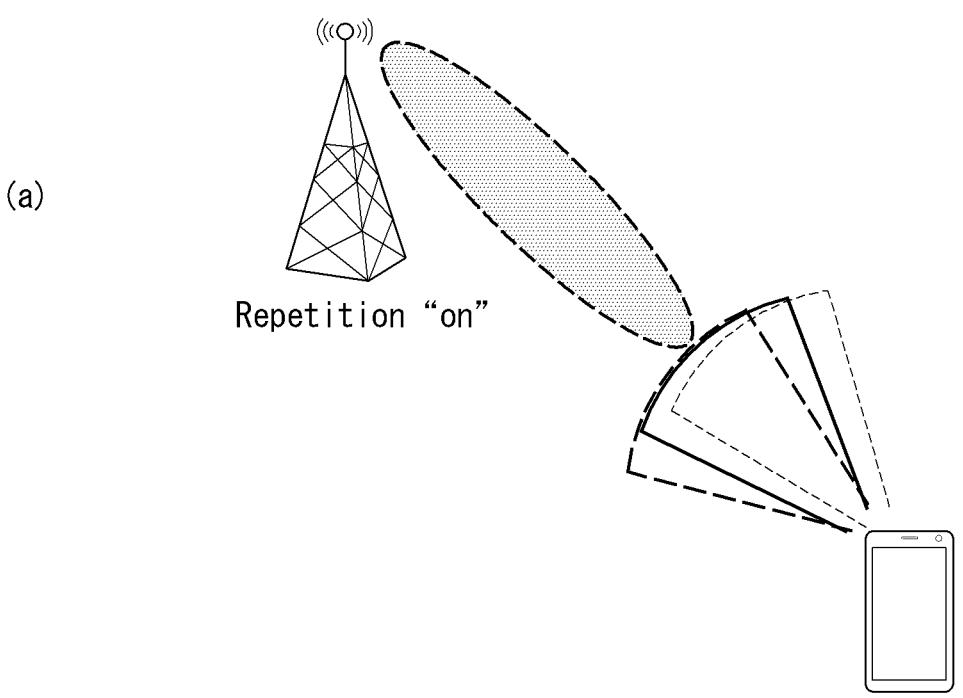
(a)
Repetition "on"
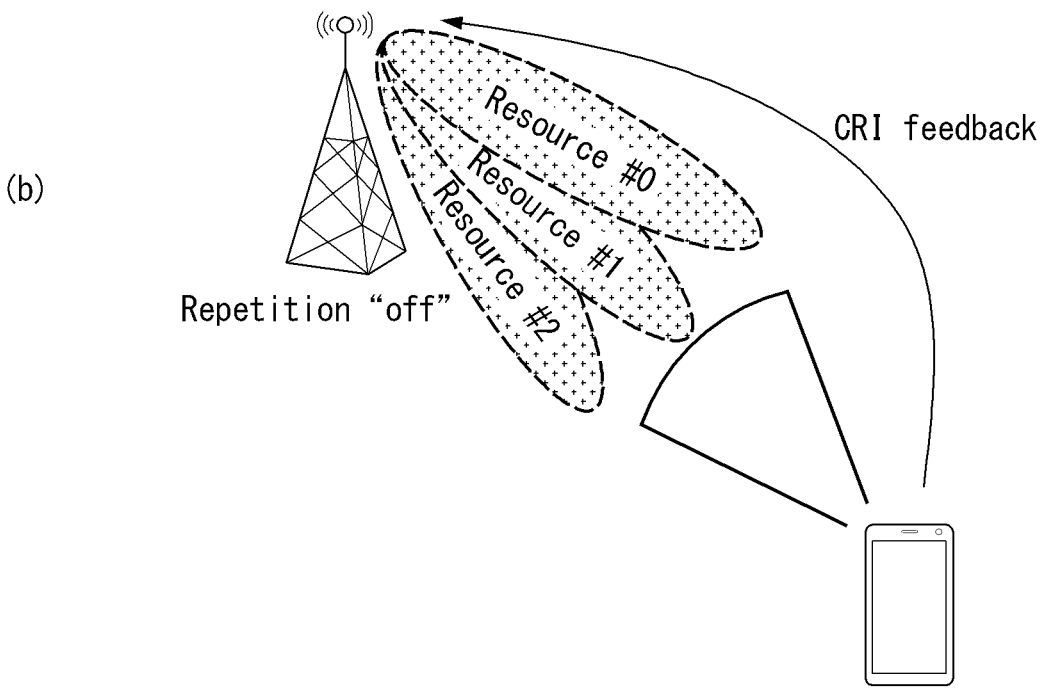
(b)
Repetition "off"

【FIG. 12】
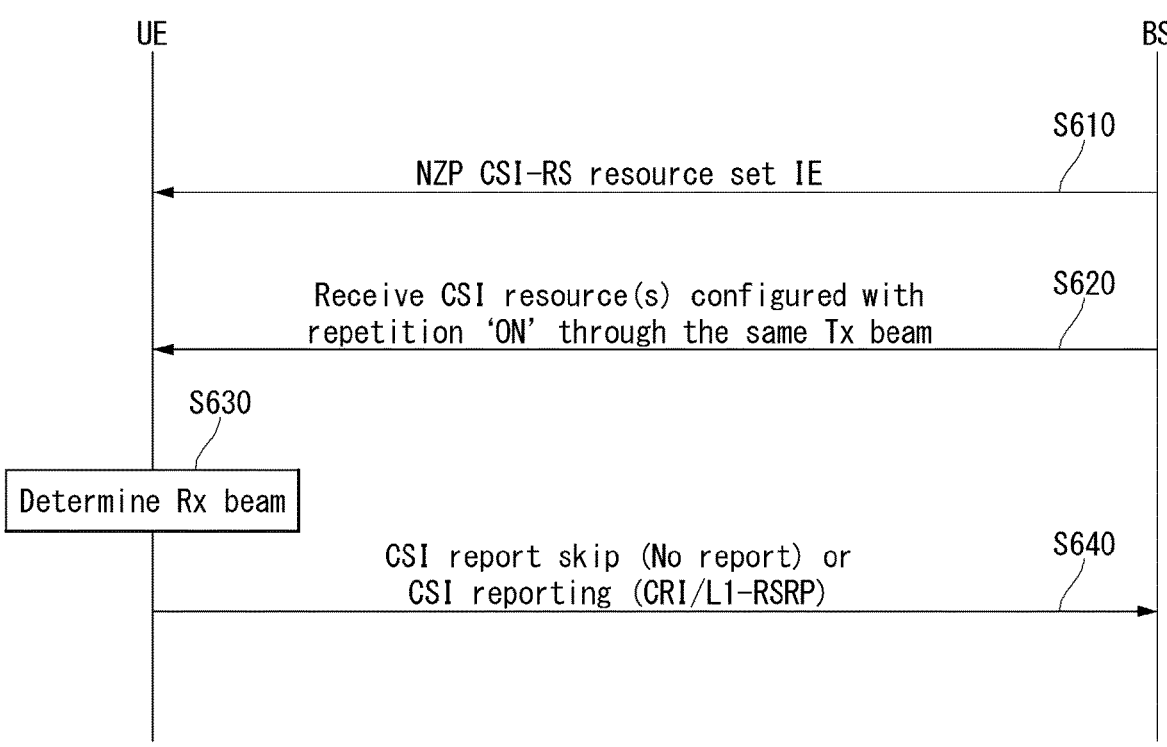
【FIG. 13】
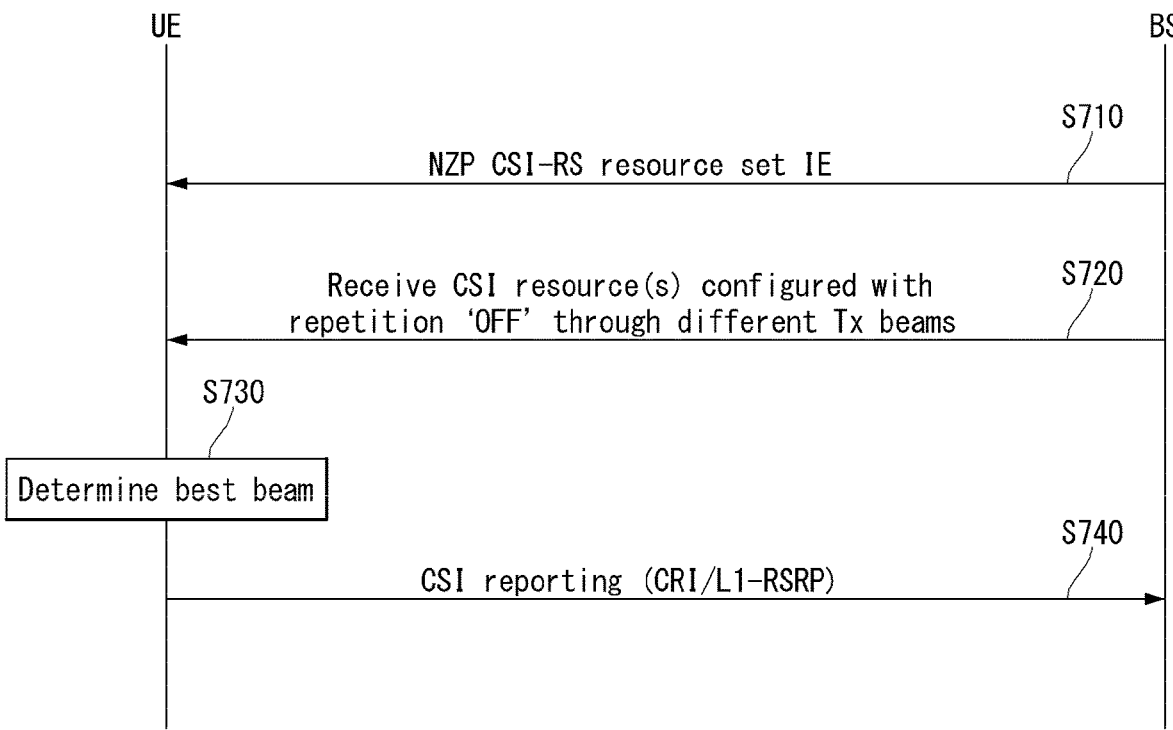

【FIG. 14】
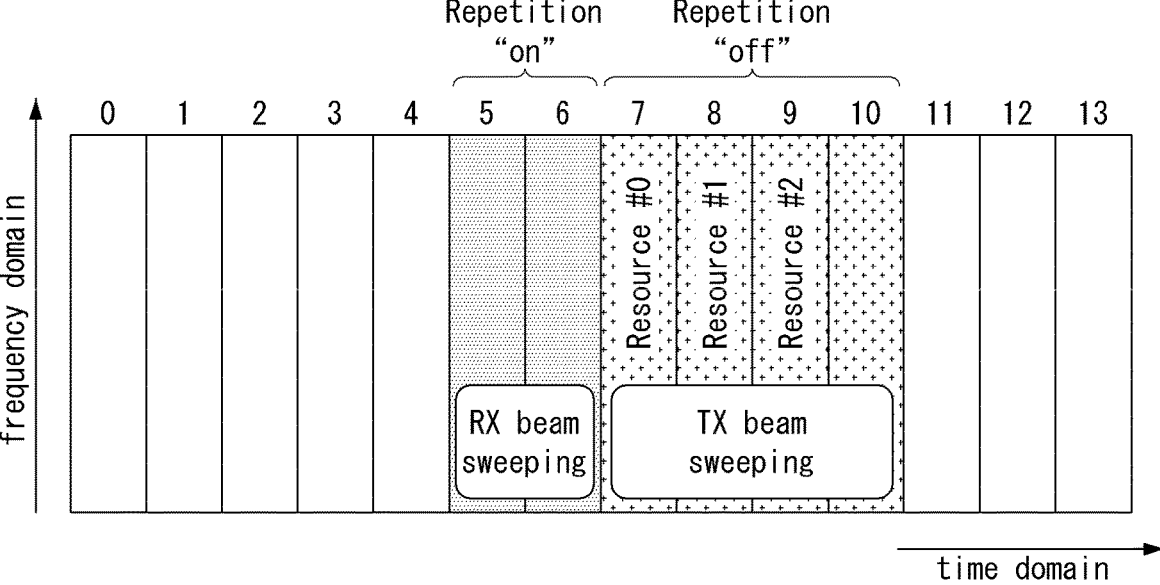
【FIG. 15】
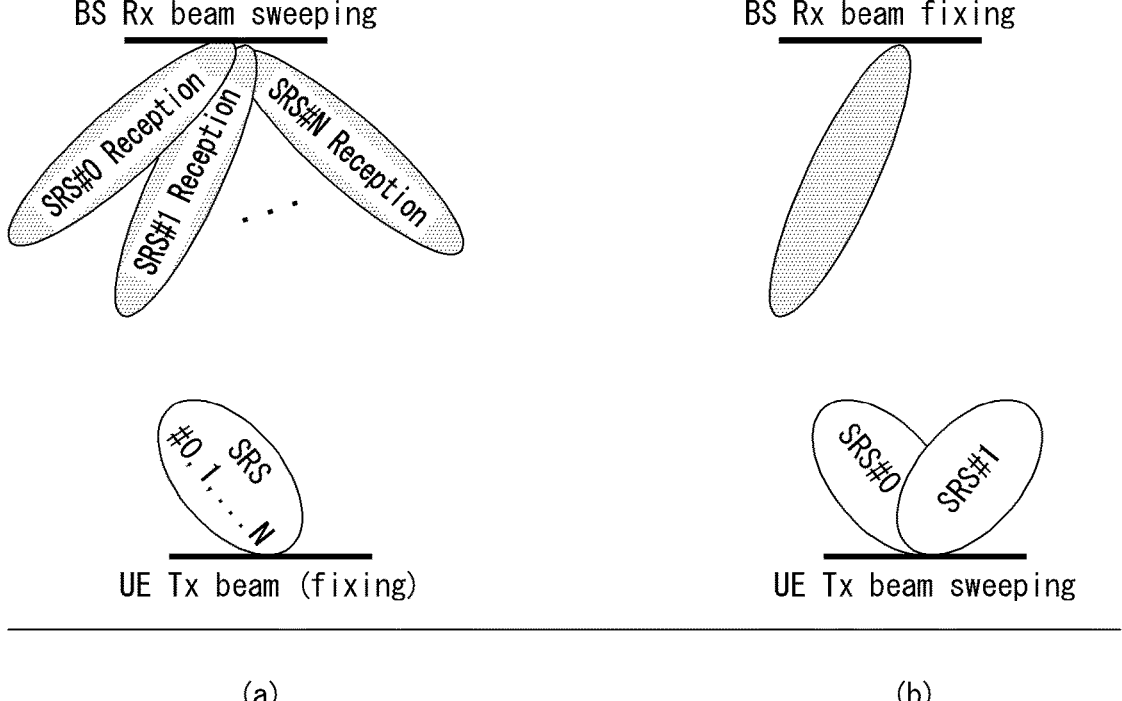
(a)                                 (b)

【FIG. 16】
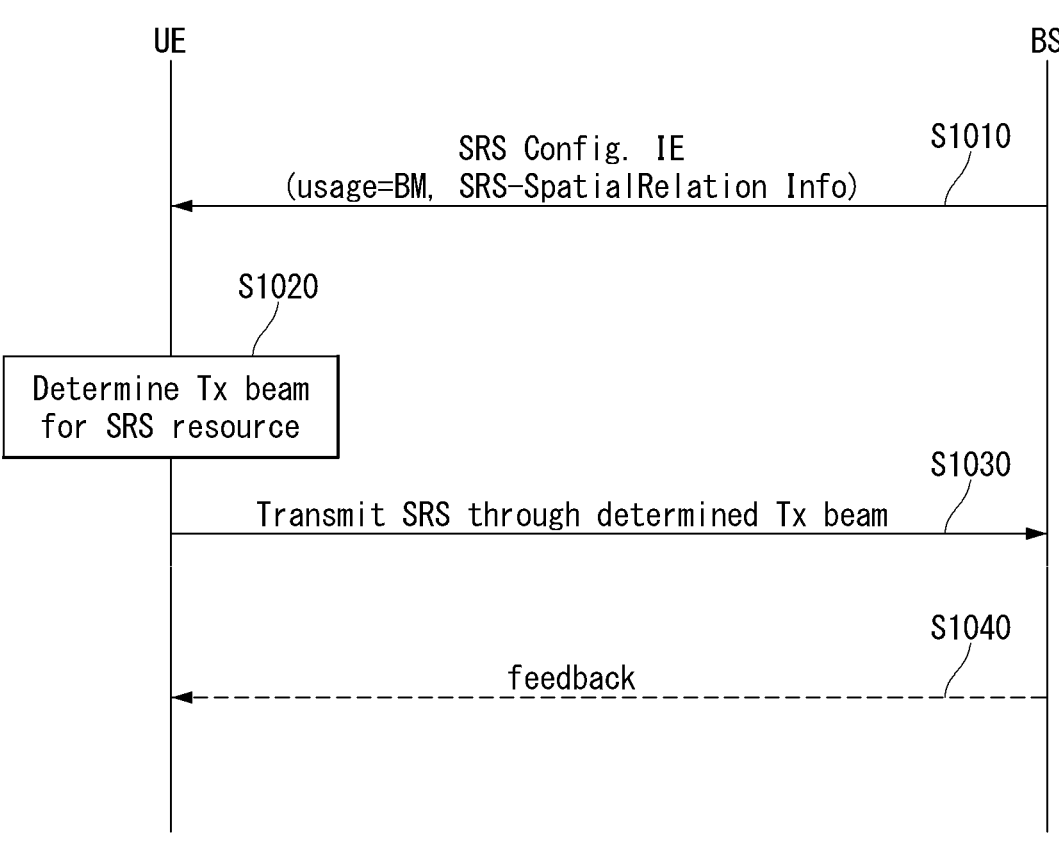

【FIG. 17】
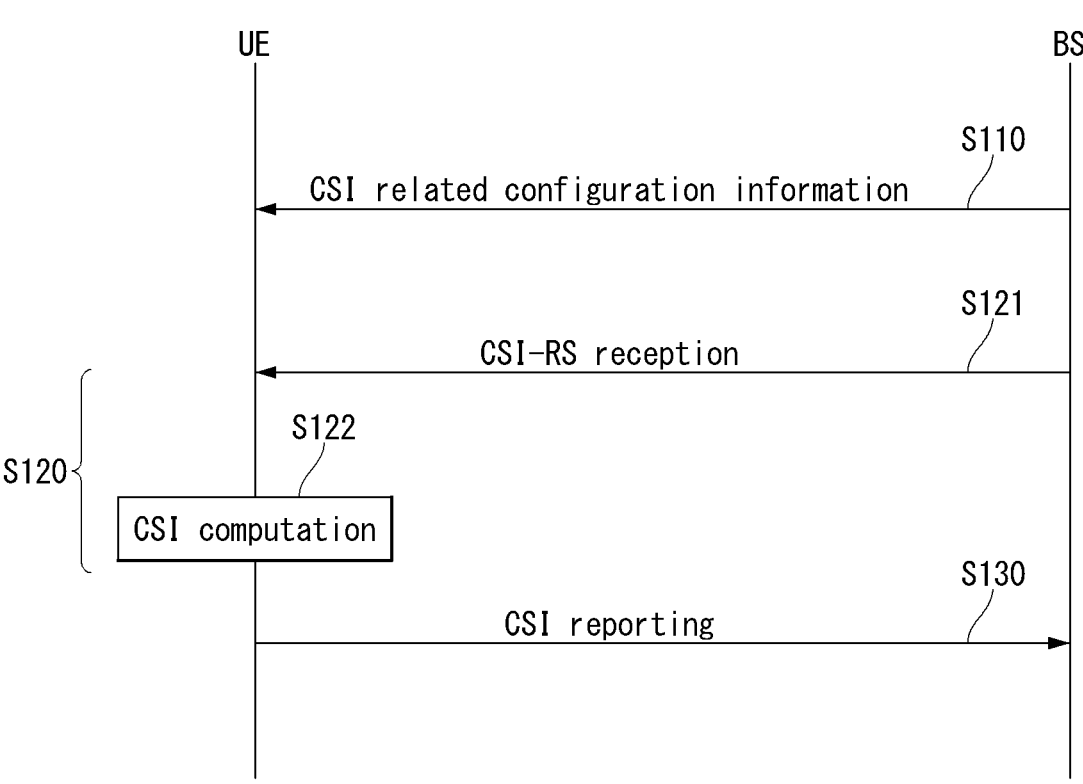

【FIG. 18】
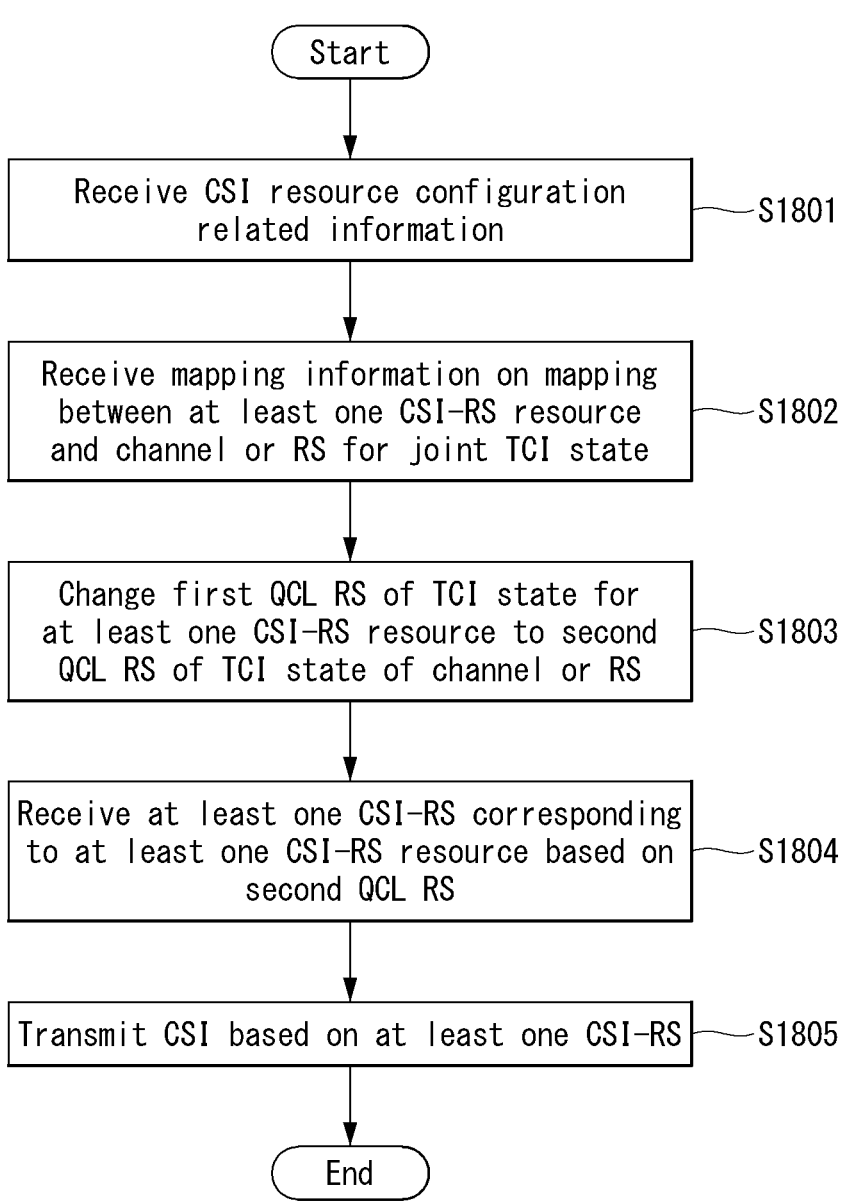

【FIG. 19】
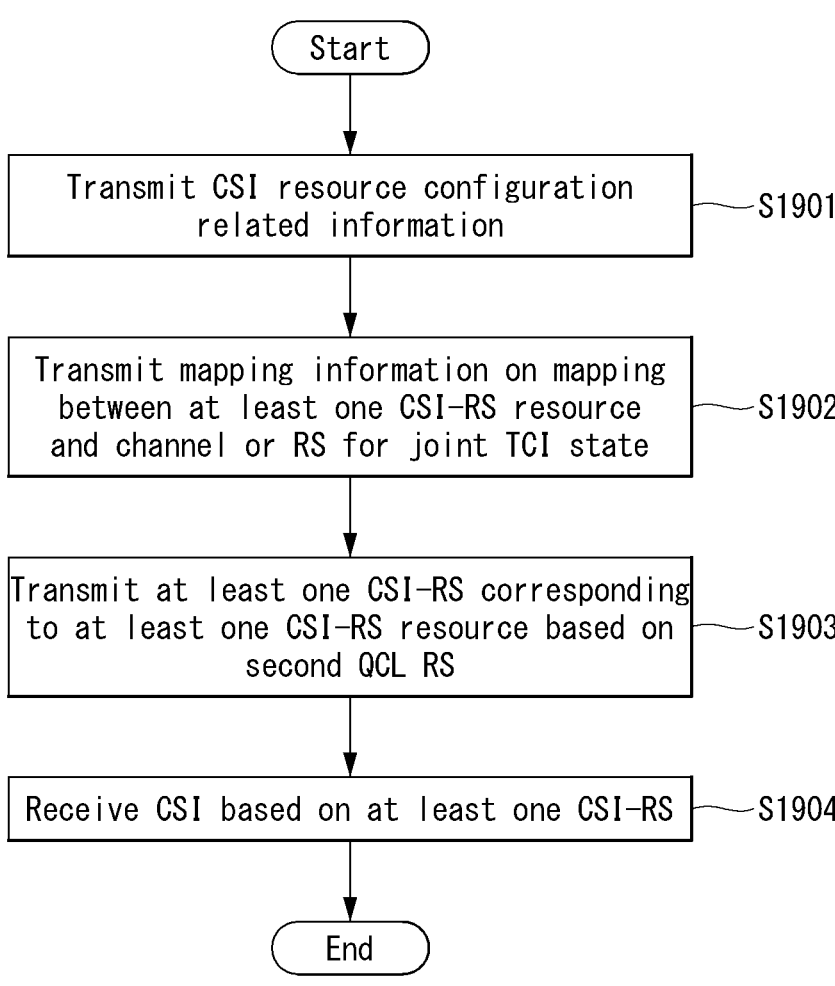

【FIG. 20】
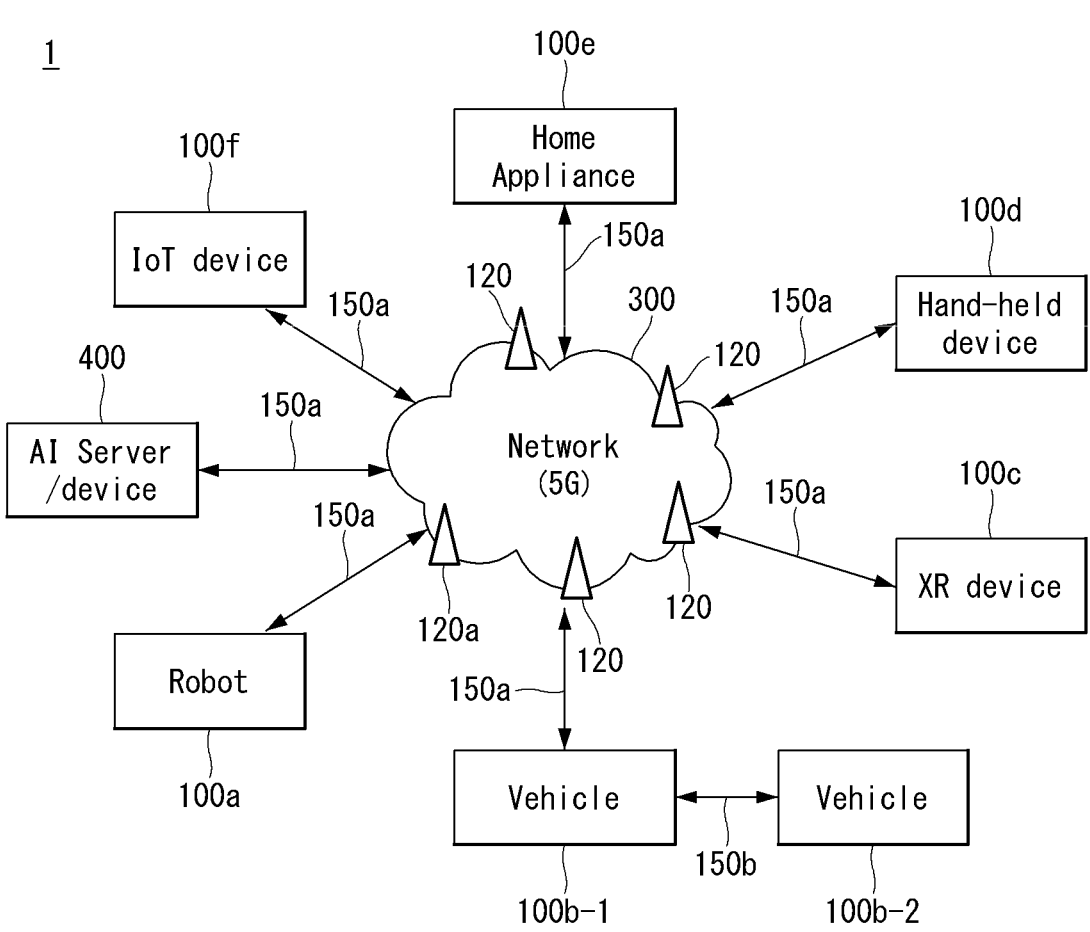

【FIG. 21】
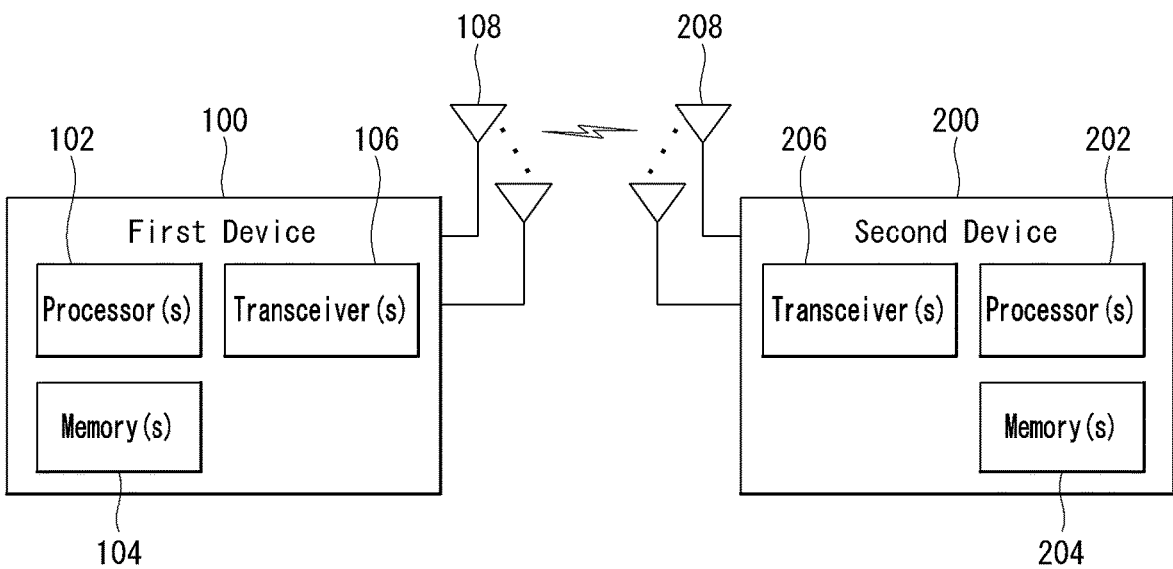
【FIG. 22】
Device(100, 200)
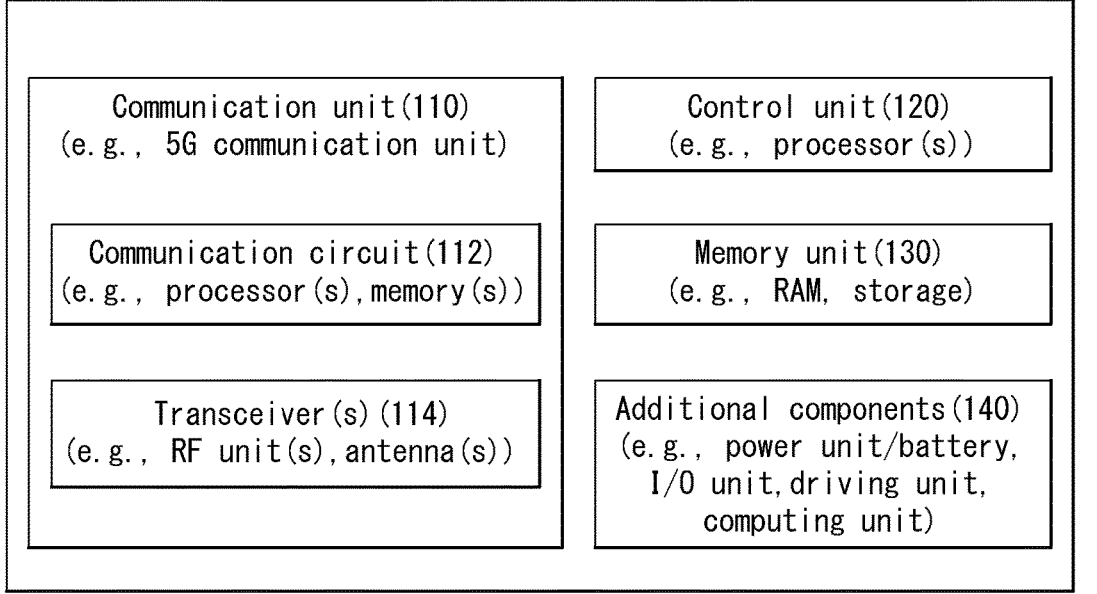

【FIG. 23】
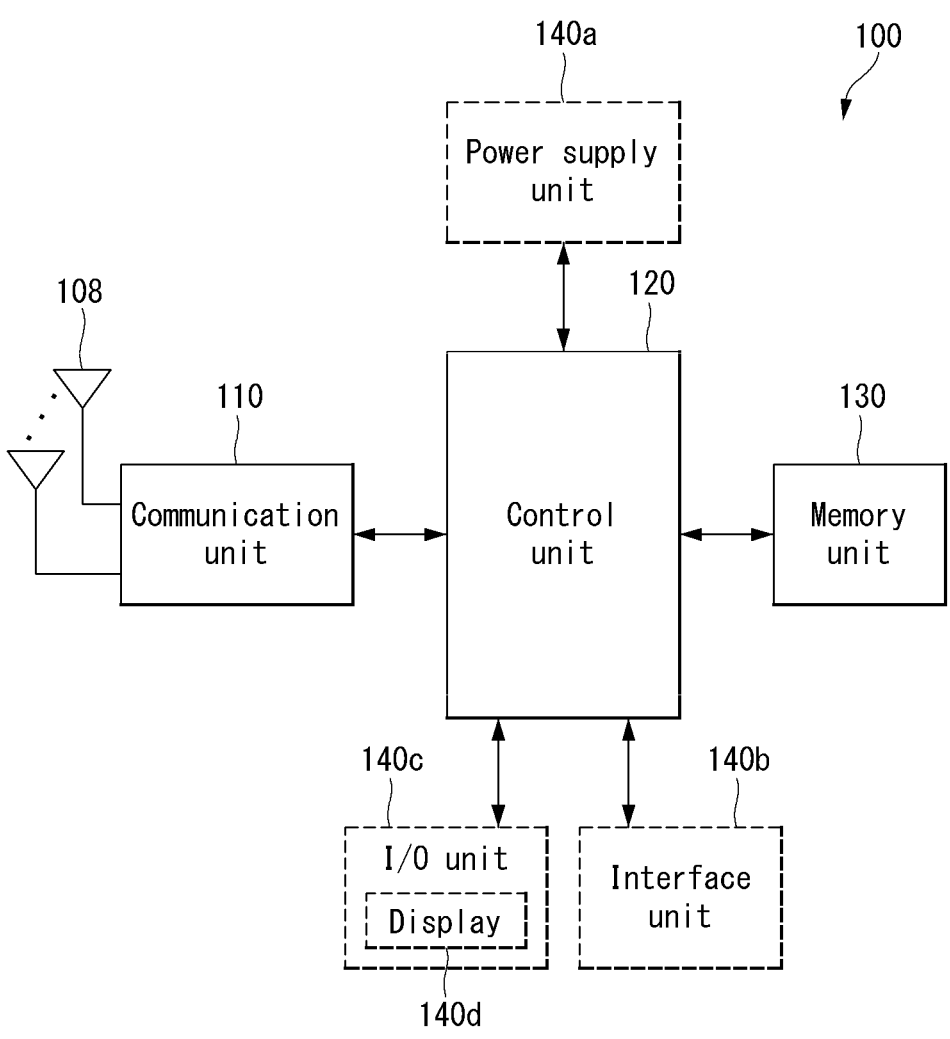

1

METHOD FOR TRANSMITTING AND RECEIVING CSI IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2022/005269, filed on Apr. 12, 2022, which claims the benefit of Korean Patent Application No. 10-2021-0048053, filed on Apr. 13, 2021. The disclosures of the prior applications are incorporated by reference in their entirety.

TECHNICAL FIELD

The present disclosure relates to a wireless communication system, and more particularly to a method of transmitting and receiving channel state information (CSI) and a device therefor.

BACKGROUND ART

Mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

Technologies capable of efficiently performing beam management while minimizing a signaling burden between a base station (BS) and a user equipment (UE) are being discussed.

DISCLOSURE

Technical Problem

The present disclosure provides a method of configuring whether to apply a joint transmission configuration indication (TCI) state per channel state information-reference signal (CSI-RS) source, and a device therefor.

The present disclosure provides a method of changing/updating a beam for uplink/downlink using a TCI state of downlink and mapping information (or beam linkage information), and a device therefor.

The present disclosure provides a method of changing/updating a beam for uplink/downlink using spatial relation information of uplink and mapping information (or beam linkage information), and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect of the present disclosure, there is provided a method of transmitting channel state information (CSI) in a wireless communication system.

The method performed by a user equipment (UE) comprises receiving CSI resource configuration related information from a base station (BS), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; receiving, from the BS, mapping information on a mapping between the at least one CSI-RS resource and a channel or an RS for the joint TCI state; changing a first QCL RS of a TCI state for the at least one CSI-RS resource to a second QCL RS of a TCI state of the channel or the RS; receiving, from the BS, at least one CSI-RS related to the at least one CSI-RS resource based on the second QCL RS; and transmitting the CSI to the BS based on the at least one CSI-RS.

The first QCL RS or the second QCL RS may be a reference RS related to QCL type D.

A port of the at least one CSI-RS may be QCLed (quasi co-located) with the second QCL RS.

The joint TCI state may be a TCI state applicable to two or more targets.

The TCI state of the channel or the RS may be related to the joint TCI state.

The mapping information may be included in a higher layer signal, a medium access control-control element, or downlink control information (DCI).

The channel may be a physical downlink control channel (PDCCH) or a physical downlink shared channel (PDSCH), and the RS may be a CSI-RS.

Based on the channel being the PDSCH, the first QCL RS may be changed to the second QCL RS after a preset time from a transmission time of a physical uplink control channel (PUCCH) including acknowledgement (ACK) information for the PDSCH.

In another aspect of the present disclosure, there is provided a user equipment (UE) configured to transmit channel state information (CSI) in a wireless communication system, the UE comprising at least one transceiver, at least one processor, and at least one memory operably connected to the at least one processor, wherein the at least one memory is configured to store instructions performing operations based on being executed by the at least one processor, wherein the operations comprise receiving CSI resource configuration related information from a base station (BS), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; receiving, from the BS, mapping information on a mapping between the at least one CSI-RS resource and a channel or an RS for the joint TCI state; changing a first QCL RS of a TCI state for the at least one CSI-RS resource to a second QCL RS of a TCI state of the channel or the RS; receiving, from the BS, at least one CSI-RS related to the at least one CSI-RS resource based on the second QCL RS; and transmitting the CSI to the BS based on the at least one CSI-RS.

In another aspect of the present disclosure, there is provided a method of receiving, by a base station (BS), channel state information (CSI) in a wireless communication system, the method comprising transmitting CSI resource configuration related information to a user equipment (UE), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; transmitting, to the UE, mapping information on a mapping between the at least one CSI-RS resource and a channel or an RS for the joint TCI state, a first QCL RS of a TCI state for the at least one CSI-RS resource being changed to a second QCL RS of a TCI state of the channel or the RS; transmitting, to the UE, at least one CSI-RS related to the at least one CSI-RS resource based on the second QCL RS; and receiving the CSI from the UE based on the at least one CSI-RS.

The first QCL RS or the second QCL RS may be a reference RS related to QCL type D.

A port of the at least one CSI-RS may be QCLed (quasi co-located) with the second QCL RS.

The joint TCI state may be a TCI state applicable to two or more targets.

The TCI state of the channel or the RS may be related to the joint TCI state.

The mapping information may be included in a higher layer signal, a medium access control-control element, or downlink control information (DCI).

The channel may be a physical downlink control channel (PDCCH) or a physical downlink shared channel (PDSCH), and the RS may be a CSI-RS.

Based on the channel being the PDSCH, the first QCL RS may be changed to the second QCL RS after a preset time from a transmission time of a physical uplink control channel (PUCCH) including acknowledgement (ACK) information for the PDSCH.

In another aspect of the present disclosure, there is provided a base station (BS) configured to receive channel state information (CSI) in a wireless communication system, the BS comprising at least one transceiver, at least one processor, and at least one memory operably connected to the at least one processor, wherein the at least one memory is configured to store instructions performing operations based on being executed by the at least one processor, wherein the operations comprise transmitting CSI resource configuration related information to a user equipment (UE), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; transmitting, to the UE, mapping information on a mapping between the at least one CSI-RS resource and a channel or an RS for the joint TCI state, a first QCL RS of a TCI state for the at least one CSI-RS resource being changed to a second QCL RS of a TCI state of the channel or the RS; transmitting, to the UE, at least one CSI-RS related to the at least one CSI-RS resource based on the second QCL RS; and receiving the CSI from the UE based on the at least one CSI-RS.

In another aspect of the present disclosure, there is provided a processing apparatus configured to control a user equipment (UE) to transmit channel state information (CSI)

in a wireless communication system, the processing apparatus comprising at least one processor, and at least one memory operably connected to the at least one processor, wherein the at least one memory is configured to store instructions performing operations based on being executed by the at least one processor, wherein the operations comprise receiving CSI resource configuration related information from a base station (BS), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; receiving, from the BS, mapping information on a mapping between the at least one CSI-RS resource and a channel or an RS for the joint TCI state; changing a first QCL RS of a TCI state for the at least one CSI-RS resource to a second QCL RS of a TCI state of the channel or the RS; receiving, from the BS, at least one CSI-RS related to the at least one CSI-RS resource based on the second QCL RS; and transmitting the CSI to the BS based on the at least one CSI-RS.

In another aspect of the present disclosure, there is provided a computer readable storage medium storing at least one instruction, wherein the at least one instruction is configured to allow at least one processor to control operations based on being executed by the at least one processor, and wherein the operations comprise receiving channel state information (CSI) resource configuration related information from a base station (BS), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; receiving, from the BS, mapping information on a mapping between the at least one CSI-RS resource and a channel or an RS for the joint TCI state; changing a first QCL RS of a TCI state for the at least one CSI-RS resource to a second QCL RS of a TCI state of the channel or the RS; receiving, from the BS, at least one CSI-RS related to the at least one CSI-RS resource based on the second QCL RS; and transmitting the CSI to the BS based on the at least one CSI-RS.

Advantageous Effects

The present disclosure can efficiently use CSI-RS sources by configuring whether to apply a joint TCI state per CSI-RS source.

The present disclosure can dynamically change/update a beam for uplink/downlink using a TCI state of downlink and mapping information (or beam linkage information).

The present disclosure can change/update a beam for uplink/downlink using spatial relation information of uplink and mapping information (or beam linkage information).

The present disclosure can also implement a low-latency and high-reliability communication system.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an example of an overall system structure of NR to which a method described in the present disclosure is applicable.

FIG. 2 illustrates a relationship between an uplink frame and a downlink frame in a wireless communication system to which a method described in the present disclosure is applicable.

FIG. 3 illustrates an example of a frame structure in an NR system.

FIG. 4 illustrates an example of a resource grid supported by a wireless communication system to which a method described in the present disclosure is applicable.

FIG. 5 illustrates a slot structure of an NR frame to which a method described in the present disclosure is applicable.

FIG. 6 illustrates examples of a resource grid per antenna port and numerology to which a method described in the present disclosure is applicable.

FIG. 7 illustrates physical channels and general signal transmission used in a 3GPP system.

FIG. 8 is a concept view illustrating an example of a beam-related measurement model.

FIG. 9 illustrates an example of a Tx beam related to a DL BM procedure.

FIG. 10 is a flow chart illustrating an example of a DL BM procedure using an SSB.

FIG. 11 illustrates an example of a DL BM procedure using a CSI-RS.

FIG. 12 is a flow chart illustrating an example of a receive (Rx) beam determination process of a UE.

FIG. 13 is a flow chart illustrating an example of a transmit (Tx) beam determination process of a base station.

FIG. 14 illustrates an example of resource allocation in a time domain and a frequency domain related to an operation of FIG. 11.

FIG. 15 illustrates an example of an UL BM procedure using an SRS.

FIG. 16 is a flow chart illustrating an example of an UL BM procedure using an SRS.

FIG. 17 is a flow chart illustrating an example of a CSI related procedure.

FIG. 18 is a flow chart illustrating an operation method of a UE described in the present disclosure.

FIG. 19 is a flow chart illustrating an operation method of a base station described in the present disclosure.

FIG. 20 illustrates a communication system (1) applied to the present disclosure.

FIG. 21 illustrates a wireless device applicable to the present disclosure.

FIG. 22 illustrates another example of a wireless device applied to the present disclosure.

FIG. 23 illustrates a portable device applied to the present disclosure.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure.

However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the disclosure may be referred to for a background art, terms, abbreviations, etc., used for describing the disclosure. For example, the following documents may be referred to.

3GPP LTE 36.211: Physical channels and modulation
36.212: Multiplexing and channel coding
36.213: Physical layer procedures
36.300: Overall description
36.331: Radio Resource Control (RRC)

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as two types of frequency ranges (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz–7125 MHz | 15, 30, 60 kHz |
| FR2 | 24250 MHz–52600 MHz | 60, 120, 240 kHz |

Regarding a frame structure in the NR system, a size of various fields in the time domain is expressed as a multiple of a time unit of $T_s=1/(\Delta f_{max}\cdot N_f)$. In this case, $\Delta f_{max}=480\cdot10^3$, and $N_f=4096$. DL and UL transmission is configured as a radio frame having a section of $T_f=(\Delta f_{max}N_f/100)\cdot T_s=10$ ms. The radio frame is composed of ten subframes each having a section of $T_{sf}=(\Delta f_{max}N_f/1000)\cdot T_s=1$ ms. In this case, there may be a set of UL frames and a set of DL frames.

FIG. 2 illustrates the relation between an uplink frame and a downlink frame in a wireless communication system to which a method proposed in the disclosure may be applied.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$n_s^\mu \in \left\{0, \dots , N_{subfame}^{slots,\mu} - 1\right\}$$

within a subframe and are numbered in increasing order of $$n_{s,f}^\mu \in \left\{0, \dots , N_{frame}^{slots,\mu} - 1\right\}$$

within a radio frame. One slot consists of consecutive OFDM symbols of $$N_{symb}^\mu, \text{ and } N_{symb}^\mu$$

is determined depending on a numerology used and slot configuration. The start of slots $$n_s^\mu$$

in a subframe is aligned in time with the start of OFDM symbols $$n_s^\mu N_{symb}^\mu$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the disclosure may be applied.

Referring to FIG. 4, a resource grid consists of $$N_{RB}^{\mu} N_{sc}^{RB}$$

subcarriers on a frequency domain, each subframe consisting of 14·2μ OFDM symbols, but the disclosure is not limited thereto.

In the NR system, a transmitted signal is described by one or more resource grids, consisting of $$N_{RB}^{\mu} N_{sc}^{RB}$$

subcarriers, and $$2^{\mu} N_{symb}^{(\mu)}$$

OFDM symbols, where $$N_{RB}^{\mu} \leq N_{RB}^{max,\mu}. \; N_{RB}^{max,\mu}$$

denotes a maximum transmission bandwidth and may change not only between numerologies but also between uplink and downlink.

In this case, as illustrated in FIG. 6, one resource grid may be configured per numerology μ and antenna port p.

FIG. 5 illustrates a slot structure of an NR frame to which a method described in the present disclosure is applicable.

A slot includes a plurality of symbols in a time domain. For example, one slot includes 7 symbols in a normal CP, while one slot includes 6 symbols in an extended CP. A carrier includes a plurality of subcarriers in a frequency domain. A resource block (RB) is defined as a plurality of (e.g., 12) consecutive subcarriers in the frequency domain. A bandwidth part (BWP) is defined as a plurality of consecutive (P)RBs in the frequency domain and may correspond to one numerology (e.g., SCS, CP length, etc.). The carrier may include up to N (e.g., 5) BWPs. The data communication may be performed through an activated BWP, and only one BWP may be activated in one UE. In a resource grid, each element is referred to as a resource element (RE), and one complex symbol may be mapped to each RE.

FIG. 6 illustrates examples of a resource grid per antenna port and numerology to which a method proposed in the disclosure is applicable.

Each element of the resource grid for the numerology μ and the antenna port p is called a resource element and is uniquely identified by an index pair (k,Ī), where $$k = 0, \dots , N_{RB}^{\mu} N_{sc}^{RB} - 1$$

is an index on a frequency domain, and $$\bar{l} = 0, \dots , 2^{\mu} N_{symb}^{(\mu)} - 1$$

refers to a location of a symbol in a subframe. The index pair (k,l) is used to refer to a resource element in a slot, where $$l = 0, \dots , N_{symb}^{\mu} - 1.$$

The resource element (k,Ī) for the numerology μ and the antenna port p corresponds to a complex value $$a_{k,\bar{l}}^{(p,\mu)}.$$

When there is no risk for confusion or when a specific antenna port or numerology is not specified, the indexes p and μ may be dropped, and as a result, the complex value may be $$a_{k,\bar{l}}^{(p)}$$

or $a_{k,\bar{l}}$.

Further, a physical resource block is defined as $$N_{sc}^{RB} = 12$$

consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequency PointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $$n_{CRB}^{u}$$

in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor$$ [Equation 1]

Here, k may be defined relative to the point A so that k=0 corresponds to a subcarrier centered around the point A. Physical resource blocks are defined within a bandwidth part (BWP) and are numbered from 0 to $$N_{BWP,i}^{size} - 1,$$

where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start}$$ [Equation 2]

Here, $$N_{BWP,i}^{start}$$

may be the common resource block where the BWP starts relative to the common resource block 0.

Physical Channel and General Signal Transmission

FIG. 7 illustrates physical channels and general signal transmission used in a 3GPP system. In a wireless communication system, a UE receives information from a base station via downlink (DL) and transmits information to the base station via uplink (UL). The information that the base station and the UE transmit and receive includes data and various control information, and there are various physical channels based on a type/usage of the information that the base station and the UE transmit and receive.

When a UE is powered on or newly enters a cell, the UE performs an initial cell search operation such as synchronizing with a base station in S701. To this end, the UE may receive a primary synchronization signal (PSS) and a secondary synchronization signal (SSS) from the base station to synchronize with the base station and acquire information such as a cell ID. Thereafter, the UE may receive a physical broadcast channel (PBCH) from the base station and acquire in-cell broadcast information. The UE may receive a downlink reference signal (DL RS) in an initial cell search step to check a downlink channel state.

The UE that completes the initial cell search operation may receive a physical downlink control channel (PDCCH) and a physical downlink shared channel (PDSCH) according to information loaded on the PDCCH to acquire more specific system information, in S702.

If the UE first accesses the base station or there is no radio resource for signal transmission, the UE may perform a random access channel (RACH) procedure on the base station in S703 to S706. To this end, the UE may transmit a specific sequence to a preamble via a physical random access channel (PRACH) in S703 and S705, and receive a response message (random access response (RAR) message) to the preamble via the PDCCH and a corresponding PDSCH. In the case of a contention based RACH, a contention resolution procedure may be additionally performed in S706.

Next, the UE performing the above-described procedure may perform PDCCH/PDSCH reception (S707) and physical uplink shared channel (PUSCH)/physical uplink control channel (PUCCH) transmission (S708) as a general uplink/downlink signal transmission procedure. In particular, the UE may receive downlink control information (DCI) on the PDCCH. Here, the DCI may include control information such as resource allocation information for the UE, and different formats may be applied to the DCI according to the use purpose.

The control information that the UE transmits to the base station via the uplink or receives from the base station may include a downlink/uplink ACK/NACK signal, a channel quality indicator (CQI), a precoding matrix index (PMI), a rank indicator (RI), and the like. The UE may transmit the control information such as the CQI/PMI/RI, etc., on the PUSCH and/or PUCCH.

Beam Management (BM) Procedure

A beam management (BM) procedure defined in new radio (NR) is described.

The BM procedure, as layer 1 (L1)/layer 2 (L2) procedures for obtaining and maintaining a set of base station (e.g., gNB, TRP, etc.) and/or terminal (e.g., UE) beams available for downlink (DL) and uplink (UL) transmission/reception, may include the following procedures and terms.

Beam measurement: operation for the base station or the UE to measure the characteristics of a received beamformed signal Beam determination: operation for the base station or the UE to select its transmit beam (Tx beam)/receive beam (Rx beam).

Beam sweeping: operation of covering a space region using the Tx and/or Rx beam for a predetermined time interval in a predetermined manner.

Beam report: operation for the UE to report information on a beamformed signal based on the beam measurement.

FIG. 8 is a concept view illustrating an example of a beam-related measurement model.

For beam measurement, an SS block (or SS/PBCH block (SSB)) or a channel state information-reference signal (CSI-RS) is used in the downlink, and a sounding reference signal (SRS) is used in the uplink.

In RRC_CONNECTED, a UE measures multiple beams (or at least one beam) of a cell, and the UE may average measurement results (RSRP, RSRQ, SINR, etc.) to derive the cell quality.

Through this, the UE may be configured to consider a sub-set of the detected beam(s).

Beam measurement-related filtering takes place at two different levels (at the physical layer to derive beam quality and then at RRC level to derive cell quality from multiple beams).

The cell quality from beam measurement is derived in the same way for serving cell(s) and for non-serving cell(s).

If the UE is configured by a gNB to report the measurement results for specific beam(s), measurement reports include measurement results for X best beams. The beam measurement result may be reported as L1-reference signal received power (RSRP).

In FIG. 8, K beams (gNB beam 1, gNB beam 2, . . . , gNB beam k) 210 correspond to the measurements on synchronization signal (SS) block (SSB) or CSI-RS resources configured for L3 mobility by the gNB and detected by the UE at L1.

In FIG. 8, layer 1 filtering 220 denotes internal layer 1 filtering of inputs measured at point A.

Further, in beam consolidation/selection 230, beam-specific measurements are consolidated (or merged) to derive cell quality.

Layer 3 filtering 240 for cell quality denotes filtering performed on measurements provided at point B.

The UE evaluates reporting criteria whenever new measurement results are reported at least at points C and C1.

D corresponds to measurement report information (message) transmitted at a radio interface.

In L3 beam filtering 250, filtering is performed on measurements (beam-specific measurement) provided at point A1.

In beam selection 260 for beam report, X measurement values are selected in measurements provided at point E.

F denotes beam measurement information included in measurement report (sent) on the radio interface.

The SSB may be used for coarse beam measurement, and the CSI-RS may be used for fine beam measurement.

The SSB may be used for both Tx beam sweeping and Rx beam sweeping.

The Rx beam sweeping using the SSB may be performed while the UE changes Rx beam for the same SSBRI across multiple SSB bursts.

One SS burst includes one or more SSBs, and one SS burst set includes one or more SSB bursts.

DL BM Procedure Using SSB

FIG. 10 is a flow chart illustrating an example of a DL BM procedure using a SSB.

The configuration for beam report using a SSB is performed upon CSI/beam configuration in a RRC connected state (or RRC connected mode).

As shown in CSI-ResourceConfig IE of Table 5, the BM configuration using the SSB is not separately defined and configures the SSB like CSI-RS resource.

Table 5 represents an example of CSI-ResourceConfig IE.

TABLE 5

```
-- ASN1START
-- TAG-CSI-RESOURCECONFIG-START
CSI-ResourceConfig ::=              SEQUENCE {
    csi-ResourceConfigId           CSI-ResourceConfigId,
    csi-RS-ResourceSetList         CHOICE {
        nzp-CSI-RS-SSB                 SEQUENCE {
            nzp-CSI-RS-ResourceSetList     SEQUENCE (SIZE (1..maxNrofNZP-CSI-RS-ResourceSetsPerConfig)) OF
NZP-CSI-RS-ResourceSetId OPTIONAL,
            csi-SSB-ResourceSetList        SEQUENCE (SIZE (1..maxNrofCSI-SSB-ResourceSetsPerConfig)) OF
CSI-SSB-ResourceSetId   OPTIONAL
        },
        csi-IM-ResourceSetList         SEQUENCE (SIZE (1..maxNrofCSI-IM-ResourceSetsPerConfig)) OF CSI-IM-
ResourceSetId
    },
    bwp-Id                         BWP-Id,
    resourceType                   ENUMERATED { aperiodic, semiPersistent, periodic },
    ...
}
-- TAG-CSI-RESOURCECONFIGTOADDMOD-STOP
-- ASN1STOP
```

The BM procedure may be divided into (1) a DL BM procedure using synchronization signal (SS)/physical broadcast channel (PBCH) block or CSI-RS, and (2) an UL BM procedure using a sounding reference signal (SRS).

Further, each BM procedure may include Tx beam sweeping for determining the Tx beam and RX beam sweeping for determining the Rx beam.

DL BM Procedure

A DL BM procedure is first described.

The DL BM procedure may include (1) transmission for beamformed DL reference signals (RSS) (e.g., CSI-RS or SS block (SSB)) of a base station, and (2) beam reporting of a UE.

The beam reporting may include preferred DL RS identifier(s) (ID) and its corresponding L1-reference signal received power (RSRP).

The DL RS ID may be a SSB resource indicator (SSBRI) or a CSI-RS resource Indicator (CRI).

FIG. 9 illustrates an example of a DL BM procedure related Tx beam.

As illustrated in FIG. 9, a SSB beam and a CSI-RS beam may be used for beam measurement.

A measurement metric is L1-RSRP per resource/block.

In Table 5, csi-SSB-ResourceSetList parameter denotes a list of SSB resources used for the beam management and reporting in one resource set. A UE receives, from the base station, CSI-ResourceConfig IE including CSI-SSB-ResourceSetList including SSB resources used for the BM, in S410.

The SSB resource set may be configured as {SSBx1, SSBx2, SSBx3, SSBx4, . . . }.

The SSB index may be defined from 0 to 63.

The UE receives the SSB resource from the base station based on the CSI-SSB-ResourceSetList, in S420.

If CSI-RS reportConfig related to a report for SSBRI and L1-RSRP is configured, the UE (beam-)reports the best SSBRI and its corresponding L1-RSRP to the base station, in S430.

That is, if reportQuantity of the CSI-RS reportConfig IE is set to 'ssb-Index-RSRP', the UE reports the best SSBRI and its corresponding L1-RSRP to the base station.

In addition, if the UE is configured with the CSI-RS resource in the same OFDM symbol(s) as SSB (SS/PBCH Block), and 'QCL-TypeD' is applicable, the UE may assume that the CSI-RS and the SSB are quasi co-located in terms of 'QCL-TypeD'.

The QCL TypeD may mean that the antenna ports are QCLed in terms of spatial Rx parameter. The same Rx beam may be applied when the UE receives a plurality of DL antenna ports with the QCL Type D relationship.

Further, the UE does not expect that the CSI-RS is configured in an RE overlapping an RE of the SSB.

DL BM Procedure Using CSI-RS

If a UE is configured with a NZP-CSI-RS-ResourceSet configured with the (higher layer parameter) repetition set to 'ON', the UE may assume that at least one CSI-RS resource within the NZP-CSI-RS-ResourceSet is transmitted with the same downlink spatial domain transmission filter.

That is, the at least one CSI-RS resource within the NZP-CSI-RS-ResourceSet is transmitted through the same Tx beam.

In this case, the at least one CSI-RS resource within the NZP-CSI-RS-ResourceSet may be transmitted in different OFDM symbols or may be transmitted in different frequency domains (i.e., through FDM).

A case where the at least one CSI-RS resource is FDMed is a case where a UE is a multi-panel UE.

Further, a case where the repetition is set to 'ON' is related to an Rx beam sweeping procedure of the UE.

The UE does not expect to receive different periodicities in periodicity AndOffset in all CSI-RS resources within NZP-CSI-RS-Resourceset.

If the repetition is set to 'OFF', the UE does not assume that at least one CSI-RS resource within NZP-CSI-RS-ResourceSet is transmitted with the same downlink spatial domain transmission filter.

That is, the at least one CSI-RS resource within NZP-CSI-RS-ResourceSet is transmitted through different Tx beams.

A case where the repetition is set to 'OFF' is related to a Tx beam sweeping procedure of a base station.

Further, the repetition parameter may be configured only with respect to CSI-RS resource sets associated with CSI-ReportConfig having the report of L1 RSRP or 'No Report (or None)'.

If the UE is configured with a CSI-ReportConfig with reportQuantity set to 'cri-RSRP' or 'none' and if the CSI-ResourceConfig for channel measurement (higher layer parameter resourcesForChannelMeasurement) contains a NZP-CSI-RS-ResourceSet that is configured with the higher layer parameter 'repetition' (repetition=ON) and without the higher layer parameter 'trs-Info', the UE can only be configured with the same number of ports (1-port or 2-port) with the higher layer parameter 'nrofPorts' for all CSI-RS resources within the NZP-CSI-RS-ResourceSet.

More specifically, uses of CSI-RS are described. If a repetition parameter is configured in a specific CSI-RS resource set and TRS_info is not configured, a CSI-RS is used for beam management.

Further, if a repetition parameter is not configured and TRS_info is configured, a CSI-RS is used for a tracking reference signal (TRS).

Furthermore, if a repetition parameter is not configured and TRS_info is not configured, a CSI-RS is used for CSI acquisition.

FIG. 11 illustrates an example of a DL BM procedure using a CSI-RS.

In FIG. 11, (a) illustrates an Rx beam determination (or refinement) procedure of a UE, and (b) illustrates a Tx beam determination procedure of a base station.

More specifically, FIG. 11(a) illustrates when a repetition parameter is set to 'ON', and FIG. 11(b) illustrates when a repetition parameter is set to 'OFF'.

An Rx beam determination process of the UE is described with reference to FIGS. 11(a) and 12.

FIG. 12 is a flow chart illustrating an example of a receive (Rx) beam determination process of a UE.

A UE receives, from a base station, a NZP CSI-RS resource set IE including a higher layer parameter repetition via RRC signaling, in S610.

Here, the repetition parameter is set to 'ON'.

The UE repeatedly receives resource(s) within a CSI-RS resource set configured with repetition 'ON' in different OFDM symbols through the same Tx beam (or DL spatial domain transmission filter) of the base station, in S620.

Through this, the UE determines its Rx beam, in S630.

Here, the UE skips a CSI report or transmits a CSI report including CRI/L1-RSRP to the base station, in S640.

In this case, reportQuantity of CSI report config may be set to 'No report (or None)' or 'CRI+L1-RSRP'.

That is, if the UE is configured with the repetition 'ON', the UE may skip the CSI report or may report ID information (CRI) for a beam pair related preferred beam and its quality value (L1-RSRP).

A Tx beam determination process of the base station is described with reference to FIGS. 11(b) and 13.

FIG. 13 is a flow chart illustrating an example of a transmit (Tx) beam determination process of a base station.

A UE receives, from a base station, a NZP CSI-RS resource set IE including a higher layer parameter repetition via RRC signaling, in S710.

Here, the repetition parameter is set to 'OFF' and is related to the Tx beam sweeping procedure of the base station.

The UE receives resources within a CSI-RS resource set configured with repetition 'OFF' via different Tx beams (DL spatial domain transmission filter) of the base station, in S720.

The UE selects (or determines) the best beam in S740, and reports an ID and relevant quality information (e.g., L1-RSRP) for the selected beam to the base station in S740.

In this case, reportQuantity of CSI report config may be set to 'CRI+L1-RSRP'.

That is, if the CSI-RS is transmitted for the BM, the UE reports CRI and L1-RSRP therefor to the base station.

FIG. 14 illustrates an example of resource allocation in a time domain and a frequency domain related to the operation of FIG. 11.

That is, if repetition 'ON' is configured in a CSI-RS resource set, a plurality of CSI-RS resources may apply the same Tx beam and may be repeatedly used, and if repetition 'OFF' is configured in the CSI-RS resource set, different CSI-RS resources may be transmitted via different Tx beams.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set.

Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 6 represents an example of TCI-State IE.

The TCI-State IE associates one or two DL reference signals (RSs) with corresponding quasi co-location (QCL) types.

TABLE 6

```
-- ASN1START
-- TAG-TCI-STATE-START
TCI-State ::=          SEQUENCE {
  tci-StateId            TCI-StateId,
  qcl-Type1              QCL-Info,
  qcl-Type2              QCL-Info
  ...
}
QCL-Info ::=          SEQUENCE {
  cell                   ServCellIndex
  bwp-Id                 BWP-Id
  referenceSignal        CHOICE {
    csi-rs                 NZP-CSI-RS-ResourceId,
    ssb                    SSB-Index
  },
  qcl-Type               ENUMERATED {typeA, typeB, typeC, typeD},
  ...
}
-- TAG-TCI-STATE-STOP
-- ASN1STOP
```

In Table 6, bwp-Id parameter denotes a DL BWP where the RS is located, cell parameter denotes a carrier where the RS is located, and referenceSignal parameter denotes reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency shift, average received power, received timing, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured).

For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE receives an activation command used to map up to eight TCI states to the codepoint of the DCI field 'Transmission Configuration Indication'.

When HARQ-ACK corresponding to the PDSCH carrying the activation command is transmitted in slot n, the indicated mapping between TCI states and codepoints of the DCI field 'Transmission Configuration Indication' may be applied starting from slot $n+3N_{slot}^{subframe,\mu}+1$. After a UE receives initial higher layer configuration of TCI states before receiving the activation command, the UE may assume that the DMRS ports of PDSCH of a serving cell are QCLed with the SS/PBCH block determined in the initial access procedure with respect to 'QCL-TypeA', and if applicable, also with respect to 'QCL-TypeD'.

If the higher layer parameter (e.g., tci-PresentInDCI) that is configured for the UE and indicates whether the TCI field within DCI is present is set to 'enabled' for the CORESET scheduling the PDSCH, the UE may assume that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, and if a time offset between the reception of DL DCI and PDSCH corresponding to this is equal to or greater than a predetermined threshold (e.g., timeDurationForQCL), for determining PDSCH antenna port QCL, the UE may assume that the TCI state or QCL assumption for the PDSCH is identical to the TCI state or QCL assumption applied for the CORESET used for the PDCCH transmission. Here, the predetermined threshold may be based on the reported UE capability.

If the parameter tci-PresentInDCI is set to 'enabled', the TCI field within DCI in a scheduling component carrier (CC) may indicate an activated TCI state of a scheduled CC or DL BWP. When the PDSCH is scheduled by the DCI format 1_1, the UE may use the TCI state based on a value of 'Transmission Configuration Indication' field of the detected PDCCH with DCI, so as to determine the PDSCH antenna port QCL.

If the time offset between the reception of DL DCI and PDSCH corresponding to this is equal to or greater than the predetermined threshold (e.g., timeDurationForQCL), the UE may assume that the DMRS ports of PDSCH of a serving cell are QCLed with the RS(s) in the TCI state with respect to the QCL type parameter(s) given by the indicated TCI state.

If a single slot PDSCH is configured for the UE, the indicated TCI state may be based on an activated TCI state of a slot with the scheduled PDSCH.

If a multi-slot PDSCH is configured for the UE, the indicated TCI state may be based on an activated TCI state of a first slot with the scheduled PDSCH, and the UE may expect that activated TCI states across slots with the scheduled PDSCH are identical.

If the UE is configured with CORESET associated with a search space set for cross-carrier scheduling, the UE may expect that the parameter tci-PresentInDCI with respect to the CORESET is set to 'enabled'. If one or more TCI states are configured for a serving cell scheduled by a search space set including QCL-TypeD, the UE may expect that a time offset between the reception of the PDCCH detected in the search space set and the PDSCH corresponding to this is equal to or greater than the predetermined threshold (e.g., timeDurationForQCL).

For both the cases when the parameter tci-PresentInDCI is set to 'enabled' and the parameter tci-PresentInDCI is not configured in an RRC connection mode, if the offset between the reception of the DL DCI and the corresponding PDSCH is less than the predetermined threshold (e.g., timeDurationForQCL), the UE may assume that the DMRS ports of PDSCH of a serving cell are QCLed with the RS(s) with respect to the QCL parameter(s) used for PDCCH QCL indication of CORESET associated with the monitored search space having the lowest CORESET-ID in the latest slot in which one or more CORESETs within the active BWP of the serving cell are monitored by the UE.

In this case, if QCL-TypeD of the PDSCH DMRS is different from QCL-TypeD of the PDCCH DMRS and they overlap in at least one symbol, the UE may expect that the reception of PDCCH associated with the CORESET is prioritized. This may also be applied for intra-band carrier aggregation (CA) (when the PDSCH and the CORESET are in different CCs). If none of configured TCI states contains 'QCL-TypeD', the UE may obtain the other QCL assumptions from the indicated TCI states for its scheduled PDSCH irrespective of the time offset between the reception of the DL DCI and the corresponding PDSCH.

For a periodic CSI-RS resource in a NZP-CSI-RS-ResourceSet configured with higher layer parameter trs-Info, the UE may expect that a TCI-State indicates one of the following QCL type(s):

'QCL-TypeC' with an SS/PBCH block and, when applicable, 'QCL-TypeD' with the same SS/PBCH block, or 'QCL-TypeC' with an SS/PBCH block and, when applicable, 'QCL-TypeD' with a CSI-RS resource in an NZP-CSI-RS-ResourceSet configured with higher layer parameter repetition.

For an aperiodic CSI-RS resource in a NZP-CSI-RS-ResourceSet configured with higher layer parameter trs-Info, the UE may expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, the UE may expect that a TCI-State indicates one of the following QCL type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with an SS/PBCH block, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, the UE may expect that a TCI-State indicates one of the following QCL type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeC' with an SS/PBCH block and, when applicable, 'QCL-TypeD' with the same SS/PBCH block.

For the DMRS of PDCCH, the UE may expect that a TCI-State indicates one of the following QCL type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For the DMRS of PDSCH, the UE may expect that a TCI-State indicates one of the following QCL type(s):

'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with CSI-RS resource in a NZP-CSI-RS-ResourceSet configured without higher layer parameter trs-Info and without repetition and, when applicable, 'QCL-TypeD' with the same CSI-RS resource.

UL BM Procedure

A UL BM may be configured such that beam reciprocity (or beam correspondence) between a Tx beam and an Rx beam is established or not established depending on the UE implementation. If the beam reciprocity between the Tx beam and the Rx beam is established in both a base station and a UE, a UL beam pair may be adjusted via a DL beam pair. However, if the beam reciprocity between the Tx beam and the Rx beam is not established in any one of the base station and the UE, a process of determining the UL beam pair is necessary separately from the DL beam pair determination.

Even if both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 15 illustrates an example of an UL BM procedure using a SRS. More specifically, FIG. 15(a) illustrates an Rx beam determination procedure of a base station, and FIG. 15(a) illustrates a Tx beam sweeping procedure of a UE.

FIG. 16 is a flow chart illustrating an example of an UL BM procedure using a SRS.

The UE receives, from the base station, RRC signaling (e.g., SRS-Config IE) including (higher layer parameter) usage parameter set to 'beam management' in S1010.

Table 7 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 7

```
-- ASN1START
-- TAG-MAC-CELL-GROUP-CONFIG-START
SRS-Config ::=                          SEQUENCE {
    srs-ResourceSetToReleaseList        SEQUENCE (SIZE(1..maxNrofSRS-ResourceSets)) OF SRS-ResourceSetId
    srs-ResourceSetToAddModList         SEQUENCE (SIZE(1..maxNrofSRS-ResourceSets)) OF SRS-ResourceSet
    srs-ResourceToReleaseList           SEQUENCE (SIZE(1..maxNrofSRS-Resources)) OF SRS-ResourceId
    srs-ResourceToAddModList            SEQUENCE (SIZE(1..maxNrofSRS-Resources)) OF SRS-Resource
    tpc-Accumulation                    ENUMERATED {disabled}
    ...
}
SRS-ResourceSet ::=                     SEQUENCE {
    srs-ResourceSetId                       SRS-ResourceSetId,
    srs-ResourceIdList                      SEQUENCE (SIZE(1..maxNrofSRS-ResourcesPerSet)) OF SRS-ResourceId
    resourceType                            CHOICE {
        aperiodic                               SEQUENCE {
            aperiodicSRS-ResourceTrigger            INTEGER (1..maxNrofSRS-TriggerStates-1),
            csi-RS                                      NZP-CSI-RS-ResourceId
            slotOffset                              INTEGER (1..32)
            ...
        },
        semi-persistent                         SEQUENCE {
            associatedCSI-RS                            NZP-CSI-RS-ResourceId
            ...
        },
        periodic                                SEQUENCE {
            associatedCSI-RS                            NZP-CSI-RS-ResourceId
            ...
        }
    },
    usage                                   ENUMERATED {beamManagement, codebook, nonCodebook,
antennaSwitching},
    alpha                                   Alpha
    p0                                          INTEGER (-202..24)
    pathlossReferenceRS                     CHOICE {
        ssb-Index                               SSB-Index,
        csi-RS-Index                            NZP-CSI-RS-ResourceId
SRS-SpatialRelationInfo ::=          SEQUENCE {
    servingCellId                           ServCellIndex                                       OPTIONAL,
    referenceSignal                         CHOICE {
        ssb-Index                               SSB-Index,
        csi-RS-Index                            NZP-CSI-RS-ResourceId,
        srs                                     SEQUENCE {
            resourceId                              SRS-ResourceId,
            uplinkBWP                               BWP-Id
        }
    }
}
SRS-ResourceId ::=                      INTEGER (0..maxNrofSRS-Resources-1)
```

In Table 7, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S1020. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS through the determined Tx beam in S1030.

More specifically, for P-SRS with 'SRS-ResourceConfigType' set to 'periodic':

i) if SRS-SpatialRelationInfo is set to 'SSB/PBCH', the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS', the UE transmits the SRS resource with the same spatial domain transmission filter used for the reception of the periodic CSI-RS or SP CSI-RS; or iii) if SRS-SpatialRelationInfo is set to 'SRS', the UE transmits the SRS resource with the same spatial domain transmission filter used for the transmission of the periodic SRS.

Even if 'SRS-ResourceConfigType' is set to 'SP-SRS' or 'AP-SRS', the beam determination and transmission operations may be applied similar to the above.

Additionally, the UE may receive or may not receive feedback for the SRS from the base station, as in the following three cases in S1040.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to FIG. 15(*a*) as the usage for the base station to select the Rx beam.

ii) The Spatial_Relation_Info may not be configured for all the SRS resources within the SRS resource set. In this case, the UE may perform transmission while freely changing SRS beams. That is, this case corresponds to FIG. 15(*b*) as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

CSI Related Operation

In a new radio (NR) system, a channel state information-reference signal (CSI-RS) is used for time and/or frequency tracking, CSI computation, layer 1 (L1)-reference signal received power (RSRP) computation, and mobility. The CSI computation is related to CSI acquisition, and the L1-RSRP computation is related to beam management (BM).

Channel state information (CSI) generally refers to information which may represent the quality of a radio channel (or also called a link) formed between a UE and an antenna port.

FIG. 17 is a flow chart illustrating an example of a CSI-related procedure.

Referring to FIG. 17, in order to perform one of uses of the CSI-RS described above, a terminal (e.g., user equipment (UE)) receives configuration information related to CSI from a base station (e.g., general Node B or gNB) via radio resource control (RRC) signaling, in S110.

The configuration information related to the CSI may include at least one of CSI-interference management (IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, etc. A CSI-IM resource set is identified by a CSI-IM resource set identifier (ID), and one resource set includes at least one CSI-IM resource. Each CSI-IM resource is identified by a CSI-IM resource ID.

ii) The CSI resource configuration-related information may be expressed by CSI-ResourceConfig IE. The CSI resource configuration-related information defines a group including at least one of a non-zero power (NZP) CSI-RS resource set, a CSI-IM resource set, or a CSI-SSB resource set. That is, the CSI resource configuration-related information includes a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

As shown in Table 8, parameters (e.g., BM-related 'repetition' parameter, tracking-related 'trs-Info' parameter) representing the use of CSI-RS per NZP CSI-RS resource set may be configured.

Table 8 shows an example of NZP CSI-RS resource set IE.

TABLE 8

```
-- ASN1START
-- TAG-NZP-CSI-RS-RESOURCESET-START
NZP-CSI-RS-ResourceSet ::=          SEQUENCE {
    nzp-CSI-ResourceSetId           NZP-CSI-RS-ResourceSetId,
    nzp-CSI-RS-Resources            SEQUENCE (SIZE
                                    (1..maxNrofNZP-CSI-RS-
                                    ResourcesPerSet))
OF NZP-CSI-RS-ResourceId,
```

TABLE 8-continued

| repetition | ENUMERATED { on, off } |
| aperiodicTriggeringOffset | INTEGER (0..4) |
| trs-Info | ENUMERATED {true} |

...

}
-- TAG-NZP-CSI-RS-RESOURCESET-STOP
-- ASN1STOP

The repetition parameter corresponding to the higher layer parameter corresponds to 'CSI-RS-ResourceRep' of L1 parameter.

iii) The CSI report configuration-related information includes a report configuration type (reportConfigType) parameter representing a time domain behavior and a report quantity (reportQuantity) parameter representing CSI-related quantity for reporting. The time domain behavior may be periodic, aperiodic or semi-persistent. The CSI report configuration-related information may be expressed by CSI-ReportConfig IE. Table 9 below shows an example of CSI-ReportConfig IE.

TABLE 9

```
-- ASN1START
-- TAG-CSI-RESOURCECONFIG-START
CSI-ReportConfig ::=                          SEQUENCE {
    reportConfigId                            CSI-ReportConfigId,
    carrier                                       ServCellIndex                     OPTIONAL,   --
Need S
    resourcesForChannelMeasurement            CSI-ResourceConfigId,
    csi-IM-ResourcesForInterference           CSI-ResourceConfigId              OPTIONAL,   -- Need R
    nzp-CSI-RS-ResourcesForInterference       CSI-ResourceConfigId              OPTIONAL,   -- Need R
    reportConfigType                          CHOICE {
        periodic                                  SEQUENCE {
            reportSlotConfig                          CSI-ReportPeriodicityAndOffset,
            pucch-CSI-ResourceList                    SEQUENCE (SIZE (1..maxNrofBWPs)) OF
PUCCH-CSI-Resource
        },
        semiPersistentOnPUCCH                     SEQUENCE {
            reportSlotConfig                          CSI-ReportPeriodicityAndOffset,
            pucch-CSI-ResourceList                    SEQUENCE (SIZE (1..maxNrofBWPs)) OF
PUCCH-CSI-Resource
        },
        semiPersistentOnPUSCH                     SEQUENCE {
            reportSlotConfig                          ENUMERATED {sl5, sl10, sl20, sl40,
sl80, sl160, sl320},
            reportSlotOffsetList                      SEQUENCE (SIZE (1.. maxNrofUL-
Allocations)) OF INTEGER (0..32),
            p0alpha                                   P0-PUSCH-AlphaSetId
        },
        aperiodic                                 SEQUENCE {
            reportSlotOffsetList                      SEQUENCE (SIZE (1..maxNrofUL-Allocations))
OF INTEGER (0..32)
        }
    },
    reportQuantity                            CHOICE {
        none                                      NULL,
        cri-RI-PMI-CQI                            NULL,
        cri-RI-i1                                 NULL,
        cri-RI-i1-CQI                             SEQUENCE {
            pdsch-BundleSizeForCSI                    ENUMERATED {n2, n4}      OPTIONAL
        },
        cri-RI-CQI                                NULL,
        cri-RSRP                                  NULL,
        ssb-Index-RSRP                            NULL,
        cri-RI-LI-PMI-CQI                         NULL
    },
```

The UE measures CSI based on the configuration information related to the CSI, in S120.

The CSI measurement may include (1) a CSI-RS reception step S121 of the UE and (2) a step S122 of computing the CSI through the received CSI-RS. This is described in detail below.

In the CSI-RS, resource element (RE) mapping of a CSI-RS resource is configured in time and frequency domains by a higher layer parameter CSI-RS-ResourceMapping.

Table 10 below shows an example of CSI-RS-ResourceMapping IE.

TABLE 10

```
-- ASN1START
-- TAG-CSI-RS-RESOURCEMAPPING-START
CSI-RS-ResourceMapping ::=          SEQUENCE {
    frequencyDomainAllocation         CHOICE {
        row1                            BIT STRING (SIZE (4)),
        row2                            BIT STRING (SIZE (12)),
        row4                            BIT STRING (SIZE (3)),
        other                           BIT STRING (SIZE (6))
    },
    nrof Ports                        ENUMERATED {p1, p2, p4, p8, p12, p16, p24, p32},
    firstOFDMSymbolInTimeDomain       INTEGER (0..13),
    firstOFDMSymbolInTimeDomain2      INTEGER (2..12)
    cdm-Type                          ENUMERATED {noCDM, fd-CDM2, cdm4-FD2-TD2, cdm8-FD2-
TD4},
    density                           CHOICE {
        dot5                            ENUMERATED {evenPRBs,
                                        oddPRBs},
        one                             NULL,
        three                           NULL,
        spare                           NULL
    },
    freqBand                          CSI-FrequencyOccupation,
    ...
}
```

In Table 10, density D denotes the density of CSI-RS resources measured in an RE/port/physical resource block (PRB), and nrofPorts denotes the number of antenna ports.

The UE reports the measured CSI to the base station, in S130.

If a quantity of CSI-ReportConfig is set to 'none (or No report)' in Table 9, the UE may skip the report.

However, even if the quantity is set to 'none (or No report)', the UE may report the measured CSI to the base station.

A case where the quantity is set to 'none' is a case where an aperiodic TRS is triggered or a case where a repetition is configured.

The report of the UE may be skipped only if the repetition is set to 'ON'.

CSI Measurement

The NR system supports more flexible and dynamic CSI measurement and reporting. The CSI measurement may include a procedure of acquiring the CSI by receiving a CSI-RS and computing the received CSI-RS.

As a time domain behavior of the CSI measurement and reporting, aperiodic/semi-persistent/periodic channel measurement (CM) and interference measurement (IM) are supported. A 4-port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (preferable channel and) precoded NZP CSI-RS. This is for intra-cell interference measurement with respect to a multi-user case and primarily targets MU interference.

The base station transmits the precoded NZP CSI-RS to the UE on each port of the configured NZP CSI-RS based IMR.

The UE assumes a channel/interference layer for each port in the resource set and measures interference.

For the channel, when there is no PMI and RI feedback, multiple resources are configured in a set, and the base station or the network indicates a subset of NZP CSI-RS resources for channel/interference measurement via DCI.

Resource setting and resource setting configuration are described in more detail.

Resource Setting

Each CSI resource setting 'CSI-ResourceConfig' includes a configuration for S≥1 CSI resource set (given by higher layer parameter csi-RS-ResourceSetList). The CSI resource setting corresponds to the CSI-RS-resourcesetlist. Here, S denotes the number of configured CSI-RS resource sets. Here, the configuration for S≥1 CSI resource set includes each CSI resource set including CSI-RS resources (consisting of NZP CSI-RS or CSI IM) and an SS/PBCH block (SSB) resource used for L1-RSRP computation.

Each CSI resource setting is positioned in a DL bandwidth part (BWP) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured with aperiodic, periodic, or semi-persistent. For the periodic and semi-persistent CSI resource settings, the number S of configured CSI-RS resource sets is limited to '1'. For the periodic and semi-persistent CSI resource settings, configured periodicity and slot offset are given in numerology of associated DL BWP as given by bwp-id.

When the UE is configured with multiple CSI-ResourceConfigs including the same NZP (non-zero power) CSI-RS resource ID, the same time domain behavior is configured for the CSI-ResourceConfig.

When the UE is configured with multiple CSI-ResourceConfigs including the same CSI-IM resource ID, the same time domain behavior is configured for the CSI-ResourceConfig.

Next, one or more CSI resource settings for channel measurement (CM) and interference measurement (IM) are configured via higher layer signaling.

CSI-IM resource for interference measurement

NZP CSI-RS resource for interference measurement

NZP CSI-RS resource for channel measurement

That is, a channel measurement resource (CMR) may be an NZP CSI-RS for CSI acquisition, and an interference measurement resource (IMR) may be an NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume that CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

For aperiodic CSI, in each trigger state configured using higher layer parameter CSI-AperiodicTriggerState, each CSI-ReportConfig is associated with one or multiple CSI-ReportConfigs linked to the periodic, semi-persistent, or aperiodic resource setting.

One reporting setting may be connected with up to three resource settings.

When one resource setting is configured, a resource setting (given by higher layer parameter resourcesForChannelMeasurement) is for channel measurement for L1-RSRP computation.

When two resource settings are configured, a first resource setting (given by higher layer parameter resourcesForChannelMeasurement) is for channel measurement, and a second resource setting (given by csi-IM-ResourcesForInterference or nzp-CSI-RS-ResourcesForInterference) is for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

For the semi-persistent or periodic CSI, each CSI-ReportConfig is linked to periodic or semi-persistent resource setting.

When one resource setting (given by resourcesForChannelMeasurement) is configured, the resource setting is for channel measurement for L1-RSRP computation.

When two resource settings are configured, a first resource setting (given by resourcesForChannelMeasurement) is for channel measurement, and a second resource setting (given by higher layer parameter csi- IM-ResourcesForInterference) is used for interference measurement performed on CSI-IM.

CSI Computation

When interference measurement is performed on CSI-IM, each CSI-RS resource for channel measurement is associated with the CSI-IM resource for each resource by the order of CSI-RS resources and CSI-IM resources within a corresponding resource set. The number of CSI-RS resources for channel measurement is equal to the number of CSI-IM resources.

When the interference measurement is performed on the NZP CSI-RS, the UE is not expected to be configured with one or more NZP CSI-RS resources in the associated resource set within the resource setting for channel measurement.

The UE set to higher layer parameter nzp-CSI-RS-ResourcesForInterference does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

All interference transport layers of the NZP CSI-RS port for interference measurement consider an energy per resource element (EPRE) ratio.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources usable by the UE are controlled by the base station.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), or L1-RSRP.

For the CQI, PMI, CRI, SSBRI, LI, RI, and L1-RSRP, the UE is configured via higher layer with $N \geq 1$ CSI-ReportConfig reporting setting, $M \geq 1$ CSI-ResourceConfig resource setting, and a list (provided by aperiodicTriggerStateList and semiPersistentOnPUSCH-TriggerStateList) of one or two trigger states. In the aperiodicTriggerStateList, each trigger state includes the channel and an associated CSI-ReportConfig list optionally indicating resource set IDs for interference. In the semiPersistentOnPUSCH-TriggerStateList, each trigger state includes one associated CSI-ReportConfig.

The time domain behavior of CSI reporting supports periodic, semi-persistent, and aperiodic.

i) The periodic CSI reporting is performed on short PUCCH and long PUCCH. The periodicity and slot offset of the periodic CSI reporting may be configured via RRC and refer to the CSI-ReportConfig IE.

ii) The semi-periodic (SP) CSI reporting is performed on short PUCCH, long PUCCH, or PUSCH.

For the SP CSI on the short/long PUCCH, the periodicity and the slot offset are configured via the RRC, and the CSI reporting is activated/deactivated via separate MAC CE.

For the SP CSI on the PUSCH, the periodicity of the SP CSI reporting is configured via the RRC, but the slot offset is not configured via the RRC, and the SP CSI reporting is activated/deactivated via DCI (format 0_1). For the SP CSI reporting on PUSCH, a separate RNTI (SP-CSI C-RNTI) is used.

An initial CSI reporting timing follows a PUSCH time domain allocation value indicated in the DCI, and a subsequent CSI reporting timing follows a periodicity configured via the RRC.

DCI format 0_1 includes a CSI request field and may activate/deactivate a specific configured SP-CSI trigger state. The SP CSI reporting has the same or similar activation/deactivation as a mechanism having data transmission on SPS PUSCH.

iii) The aperiodic CSI reporting is performed on the PUSCH and is triggered by the DCI. In this case, information related to the trigger of aperiodic CSI reporting may be delivered/indicated/configured via the MAC-CE.

For the AP CSI with AP CSI-RS, an AP CSI-RS timing is configured by the RRC, and a timing for the AP CSI reporting is dynamically controlled by the DCI.

The NR does not apply a scheme (e.g., transmitting RI, WB PMI/CQI, and SB PMI/CQI in this order) of dividing and reporting the CSI in multiple reporting instances that have been applied to PUCCH based CSI reporting in the LTE. Instead, the NR restricts specific CSI reporting not to be configured on the short/long PUCCH, and a CSI omission rule is defined. In relation with the AP CSI reporting timing, a PUSCH symbol/slot location is dynamically indicated by the DCI. Further, candidate slot offsets are configured by the RRC. For the CSI reporting, slot offset(Y) is configured per reporting setting. For UL-SCH, slot offset K2 is configured separately.

Two CSI latency classes (low latency class and high latency class) are defined in terms of CSI computation complexity. The low latency CSI is WB CSI including a maximum of 4 ports Type-I codebook or a maximum of 4-ports non-PMI feedback CSI. The high latency CSI refers to CSI other than the low latency CSI. For a normal UE, (Z, Z') is defined in unit of OFDM symbols. Here, Z denotes a minimum CSI processing time from the reception of the aperiodic CSI triggering DCI to the execution of the CSI reporting. Further, Z' denotes a minimum CSI processing time from the reception of the CSI-RS for channel/interference to the execution of the CSI reporting.

In addition, the UE reports the number of CSIs capable of being simultaneously calculated.

The contents described above (3GPP system, frame structure, NR system, etc.) can be combined with methods proposed in the present disclosure to be described below. And/or, the contents described above can be supplemented to clarify technical features of the methods proposed in the present disclosure. And/or, in the present disclosure, '/' means 'and', 'or', or 'and/or' based on the context. And/or, in the present disclosure, '( )' can be interpreted as both when excluding content in ( ) and when including content in parentheses. And/or, in the present disclosure, '( )' may mean a group of elements (or contents) in parentheses, or may mean the abbreviation/full name of the term before parentheses, and/or may mean writing contents before parentheses in English.

The NR downlink (DL) beam management (BM) and physical downlink control channel (PDCCH) Rx beam configuration/update method of the UE in the above-described BM procedure requires radio resource control (RRC) re-configuration/medium access control-control element (MAC-CE) message transmission, in order to update information of a transmission configuration indication (TCI) state of control resource set (CORESET) configuration. For the purpose of physical downlink shared channel (PDSCH) Rx beam configuration/update, the operation described above is also required.

Further, as a physical uplink control channel (PUCCH)/ physical uplink shared channel (PUSCH) beam indication method also requires RRC re-configuration/MAC CE message transmission in order to update spatial relation information with respect to the beam change, there are disadvantages in that flexibility for uplink/downlink Tx/RX beam change is reduced, and a unnecessary signaling overhead is caused by the update.

In order solve the above-described problems, the present disclosure proposes a method of dynamically changing Tx/RX beams of UL/DL channel, that are a target, based on DL Rx beam information (e.g., quasi-co location (QCL) related information) or uplink (UL) Tx beam information that is a reference while minimizing a signaling overhead. That is, a connection relationship and a range of reference/ target RSs for DL and UL may be dynamically indicated to downlink control information (DCI) by configuring a linkage relationship for target RS(s) with respect to a reference signal (RS) that is a reference.

This means that a reference RS information for a beam to be used for UL/DL can increase association flexibility for Tx/RX beam determination by utilizing a TCI state and spatial relation information. Further, there are advantages in that dynamic Tx/RX beam indication/determination can be performed through DCI beam change/update based on an UL/DL beam linkage relationship, and a payload can also decrease by omitting beam configuration/indication relation field within DCI based on a specific linkage.

And/or, in order to avoid a conflict with the existing UL/DL Tx/RX beam configuration/update method, if there is an explicit indication through an enabler that indicates to apply proposal methods of the present disclosure, the proposal methods of the present disclosure can be used/applied. For example, RRC configuration configures 'beam_linkage_enabler' about whether there is a beam configuration/ update operation through application of beam linkage information, and if the enabler is "OFF", the existing operation may be performed. If the enabler is 'ON', the proposal methods (e.g., first to fifth embodiments) of the present disclosure may be activated.

Hereinafter, in the present disclosure, spatial relation info (information) may mean to include RS information/QCL relation RS information/QCL parameter, etc. for spatial relation assumption for data/signal transmitted/received through UL channel/DL channel, or may be expressed/ applied by mixing/replacing the above terms.

Specifically, the present disclosure describes a method of configuring beam linkage state information via higher layer signaling (hereinafter, first embodiment), a method of changing/updating a beam for uplink/downlink channel/RS based on a beam linkage state indication by using a TCI state of PDCCH/PDSCH (hereinafter, second embodiment), a method of changing/updating a beam for uplink/downlink channel/RS based on a beam linkage state indication by using an RS indicated via spatial relation info of PUCCH/ PUSCH (hereinafter, third embodiment), a method of defining a time of changing/updating Tx/Rx beam of channel/RS (hereinafter, fourth embodiment), and a method of configuring a CSI-RS to apply a beam change/update based on a joint TCI state (hereinafter, fifth embodiment).

Embodiments described below in the present disclosure are merely distinguished for convenience of explanation. Thus, it is obvious that partial method and/or partial configuration of any embodiment can be substituted or combined with partial method and/or partial configuration of another embodiment.

A slot, a subframe, a frame, etc. described in embodiments of the present disclosure may be detailed examples of predetermined time units used in a wireless communication system. That is, when applying methods described in the present disclosure, time unit can be replaced by other time units applied to other wireless communication systems.

In the present disclosure, L1 signaling may mean DCI based dynamic signaling between a base station and a UE, and L2 signaling may mean radio resource control (RRC)/medium access control-control element (MAC-CE) based higher layer signaling between a base station and a UE.

A first embodiment is first described below.

First Embodiment

The first embodiment describes a method of configuring, by a base station, beam linkage state information to a UE via higher layer signaling (e.g., RRC, etc.).

Methods described below are merely distinguished for convenience of explanation. Thus, it is obvious that configuration of any method can be substituted or combined with configuration of another method.

As described above, to configure/update a specific spatial domain Tx/Rx parameter for applied/used when transmitting and receiving BM of current NR and RS/channel of a UE, a TCI state or spatial relation info is RRC-reconfigured or a method through MAC CE message reception is required. Therefore, there is a problem in terms of signaling overhead and flexibility for the beam change. Further, a beam indication of specific RSs/channels operates by configuration via UL/DL DCI. Hence, there is a problem in that a size of a payload for the corresponding field configuration of DCI increases.

In order to solve the above-described problems, it may be configured to perform an operation of changing/updating reception or transmission spatial domain filter(s) of other (target) RS(s)/channel(s) based on a spatial domain filter (or beam) applied/used when transmitting and receiving a specific RS/channel that is a reference.

In this instance, a connection relationship between a beam of a specific RS/channel, that is a reference, and other RS(s)/channel(s) (i.e., target) to be changed based on the beam is represented by a beam linkage state (BLS).

For example, in an operation in which a PDSCH Rx beam related information and the corresponding acknowledgement (ACK)/non-acknowledgement (NACK) PUCCH Tx beam related information have been respectively indicated to a TCI field of the existing DCI format 1_1 and a PUCCH resource indicator (PRI) field, if an association relationship (or connection relationship) based on a PDSCH Rx beam indication with respect to ACK/NACK PUCCH Tx beam determination is indicated through the beam linkage state, a spatial domain Tx filter corresponding to the spatial domain Rx filter used during the PDSCH reception may be applied for the ACK/NACK PUCCH Tx beam, and the corresponding transmission may be performed. That is, the beam linkage state may configure an application range for other (target) RS(s)/channel(s) Tx/Rx beam indication based on the Tx/Rx beam of RS/channel that is a reference for each state.

And/or, it is possible to configure in detail the applied step in the specific RS/channel. For example, for the PUCCH, the beam change/update may be applied for all the configured PUCCHs. And/or, the beam linkage state may be configured/ set/defined to be limitedly applied only to a specific PUCCH (e.g., scheduling request (SR) PUCCH/ACK/NACK PUCCH/CSI PUCCH, etc.). Detailed examples and advantages of this are explained in the second and third embodiments.

And/or, in a method of configuring the beam linkage state, only a set of RSs/channels that is a target may be configured and operate, or a connection relationship for a target RS/channel set to be applied per spatial domain filter (or beam) applied/used upon the reception or transmission of a specific RS/channel, that is a reference, may be configured.

Table 11 shows an example of the beam linkage state for the target RS/channel set.

TABLE 11

| Beam linkage state | Reference | Target |
|---|---|---|
| #1 | PUCCH | Target set A |
| | PDSCH | Target set B |
| #2 | PDSCH | Target set A |
| | PUSCH | Target set B |

For example, when the set of RSs/channels that is a target has been configured as two sets of a 'target set A' and a 'target set B', the beam linkage state may be expressed as in Table 11. For convenience of explanation, this embodiment is described focusing on an example in which the two target sets are configured, but does not limit the technical scope of the present disclosure. It is obvious that this embodiment can be applied even when three or more target sets are configured.

For example, in Table 11, Target set A={PUSCH, CSI PUCCH, PDCCH} and Target set B={SR PUCCH}. For example, if Beam linkage state #1 is configured/indicated, spatial domain filters (or beams) of a PUSCH, a CSI PUCCH, and a PDCCH may be changed/updated based on the PUCCH that is a reference channel, and/or a spatial domain filter (or beam) of an SR PUCCH may be changed/updated based on the PDSCH that is a reference channel.

And/or, the proposal methods of the present disclosure may be performed through the configuration/indication of the beam linkage state via the MAC CE. That is, a specific ID (index) for the beam linkage state may be indicated to the MAC CE, and UL/DL Tx/Rx beam may be changed/updated based on an indicated beam linkage scheme until a next MAC CE is updated after a specific time (e.g., applicable timing (e.g., after 3 msec from the ACK transmission)). In this instance, the beam linkage field may be deactivated in DCI, or specific field(s) within a DCI format may be omitted and configured/set based on the beam linkage scheme.

And/or, the DCI may be utilized to perform the more dynamic method based on the beam linkage state. Hereinafter, the second and third embodiments describe a method of performing UL/DL Tx/Rx beam change/update through a dynamic indication based on DCI.

Second Embodiment

The second embodiment describes a method of changing/updating, by a UE, a spatial Tx parameter/spatial Rx parameter for uplink/downlink RS(s)/channel(s) based on a beam linkage state indication using an indicated TCI state of PDCCH/PDSCH.

Methods described below are merely distinguished for convenience of explanation. Thus, it is obvious that configuration of any method can be substituted or combined with configuration of another method.

The proposal method of the present embodiment is a method of changing/updating, based on a beam linkage state, Tx/Rx beam of other RS(s)/channel(s) based on a PDCCH/PDSCH Rx beam indication.

Unlike the MAC-CE based operation according to the first embodiment, if 'beam_linkage_enabler' of a beam linkage state field is 'ON', the operation according to the second embodiment may be activated via DCI and performed by indicating the corresponding beam linkage state ID to a codepoint.

For example, in the proposal method, the TCI state indicated via DCI for PDSCH scheduling may be a TCI state of a specific TCI state ID indicated to a codepoint in a TCI field of DCI format 1_1. Based on QCL information with DL reference RS(s) of the corresponding TCI state ID (i.e., a TCI state ID associated with the PDSCH), the UE may change/update a reference RS of spatial relation info used during specific UL RS/channel transmission to a DL reference RS (of the PDSCH) based on beam linkage state information. And/or, the UE may change/update a TCI state/spatial Rx parameter of a specific DL RS/channel so that it follows DL reference RS/QCL assumption of the corresponding TCI state ID (i.e., the TCI state ID associated with the PDSCH) based on the beam linkage state information.

Table 12 shows an example of the beam linkage state based on DCI format 1_1.

TABLE 12

| Beam linkage state | PDSCH | A/N PUCCH | All configured PUCCH | PUSCH | PDCCH |
|---|---|---|---|---|---|
| #1 | 1 | 1 | 0 | 0 | 0 |
| #2 | 1 | 0 | 1 | 0 | 0 |
| #3 | 1 | 0 | 0 | 1 | 0 |
| #4 | 1 | 0 | 0 | 0 | 1 |
| #5 | 1 | 1 | 0 | 1 | 0 |
| #6 | 1 | 1 | 0 | 0 | 1 |
| #7 | 1 | 0 | 1 | 1 | 0 |
| #8 | 1 | 0 | 1 | 0 | 1 |
| #9 | 1 | 1 | 0 | 1 | 1 |
| #10 | 1 | 0 | 1 | 1 | 1 |

For example, a beam linkage state for the Tx/Rx beam determination of RS(s)/channel(s) based on the PDSCH Rx beam may be the same as Table 12. Table 12 is merely an example for convenience of explanation, and does not limit the technical scope of the present disclosure. Therefore, specific rules other than the forms of Table 12 may be defined.

Referring to Table 12, a connection relationship for PUCCH, PUSCH, and PDCCH with respect to the PDSCH may be expressed through 0 and 1. For example, if beam linkage state #5 is indicated through the corresponding field of DCI, an operation transmitted by applying a spatial domain Tx filter corresponding to a PDSCH Rx spatial domain Rx filter to A/N PUCCH and PUSCH Tx beam may be performed. In this instance, a PRI field for A/N PUCCH of the DCI format 1_1 may be omitted.

According to the present embodiment, improvements in efficiency of an uplink data channel and reliability of A/N PUCCH can be expected by utilizing the high channel quality of PDSCH Rx beam direction. And/or, the degree and effect of a payload reduction generated for each beam linkage state may vary, but it is obvious that simplicity for the Tx/Rx beam indication for RS/channel and the association flexibility of beam determination obtained by using both the TCI state and the spatial relation info can be improved.

Table 12 shows the A/N PUCCH, but the PUCCH to be applied to the beam linkage state may variously exist depending on its purpose/use, etc. Therefore, the PUCCH is expressed in a comprehensive form, such as PUCCH type A and PUCCH type B, without being specified to the A/N PUCCH, etc. as in the above example, and may be configured/indicated to the beam linkage state.

The corresponding PUCCH type(s) may be configured to be pre-defined or explicitly classified in the following ways or in a specific way.

For example, the PUCCH type(s) may be classified as follows based on use/contents/format/dedicated or non-dedicated PUCCH of the PUCCH.

Classification based on the PUCCH use (e.g., TypeA=SR, HARQ-ACK, CSI PUCCH/TypeB=BFRQ PUCCH)

Classification based on the PUCCH format (e.g., TypeA=short PUCCH (format 0,2)/TypeB=long PUCCH (format 1, 3, 4))

Classification based on the dedicated/non-dedicated (e.g., PUCCH/TypeB=dedicated PUCCH for HARQ-ACK with respect to TypeA=RACH procedure Msg.4)

The classification way of the PUCCH described above may also be applied to beam linkage state setting/configuration of the third embodiment to be described below.

Third Embodiment

The third embodiment describes a method of changing/updating, by a UE, a spatial Tx parameter/spatial Rx parameter for uplink/downlink RS(s)/channel(s) based on a beam linkage state indication by using an RS indicated to spatial relation info of a PUCCH/PUSCH Methods described below are merely distinguished for convenience of explanation. Thus, it is obvious that configuration of any method can be substituted or combined with configuration of another method.

The proposal method of the present embodiment is a method of changing/updating, based on a beam linkage state, Tx/Rx beam of other RS(s)/channel(s) based on a PUCCH/PUSCH Tx beam indication. In the same manner as the second embodiment, if 'beam_linkage_enabler' of a beam linkage state field is 'ON', the operation according to the third embodiment may be activated via DCI and performed by indicating the corresponding beam linkage state ID to a codepoint.

For example, in the proposal method of the third embodiment, in case of a sounding reference signal resource indicator (SRI) indicated to PUSCH scheduling, there is a codebook (CB)/non-codebook (non-CB) based method. In the CB based method, PUSCH may be transmitted based on 1-bit SRI within DCI format 0_1, a transmit precoder matrix indicator (TPMI), and a transmit rank indicator (TRI) field. Further, in the non-CB based method, up to four 1-port sounding reference signal (SRS) resources ate transmitted to a base station based on a corresponding beam of each spatial relation info, and the base station receiving this may indicate SRI(s) to be applied for PUSCH transmission to a UE via DCI.

Therefore, in the non-CB based method, the corresponding beam selection of an SRI to be used based on beam linkage information among a plurality of SRIs may be performed based on a specific method promised by the base station and the UE or a specific SRI (e.g., first/last SRI) indicated by the base station via DCI.

Table 13 shows an example of the beam linkage state based on DCI format 0_1.

TABLE 13

| Beam linkage state | PUSCH | SR PUCCH | All configured PUCCH | PDSCH | PDCCH |
|---|---|---|---|---|---|
| #1 | 1 | 1 | 0 | 0 | 0 |
| #2 | 1 | 0 | 1 | 0 | 0 |
| #3 | 1 | 0 | 0 | 1 | 0 |
| #4 | 1 | 0 | 0 | 0 | 1 |
| #5 | 1 | 1 | 0 | 1 | 0 |
| #6 | 1 | 1 | 0 | 0 | 1 |
| #7 | 1 | 0 | 1 | 1 | 0 |
| #8 | 1 | 0 | 1 | 0 | 1 |
| #9 | 1 | 1 | 0 | 1 | 1 |
| #10 | 1 | 0 | 1 | 1 | 1 |

For example, a beam linkage state for the Tx/Rx beam determination of RS(s)/channel(s) based on the PUSCH Rx beam may be the same as Table 13. Table 13 is merely an example for convenience of explanation, and does not limit the technical scope of the present disclosure. Therefore, specific rules other than the forms of Table 13 may be defined.

Referring to Table 13, a connection relationship for PUCCH, PDSCH, and PDCCH with respect to the PUSCH may be expressed through 0 and 1. For example, if beam linkage state #6 is indicated through the corresponding field of DCI, an operation of applying each of a spatial domain Tx filter and a spatial domain Rx filter corresponding to a spatial domain Tx filter for spatial relation info of PUSCH transmission with respect to an SR PUCCH Tx beam and a PDCCH Rx beam may be performed. In this instance, improvements in efficiency of a subsequent uplink request and a downlink data reception can be expected by utilizing the high channel quality of PUSCH Tx beam direction.

Table 13 shows the SR PUCCH, but as described above, the beam linkage configuration method can also be applied for PUCCH type(s) capable of being classified based on use/contents/format/dedicated or non-dedicated PUCCH of the PUCCH.

In the methods/schemes proposed above, the beam linkage state has described the case in which the reference RS/channel is PUCCH/PUSCH/PDCCH/PDSCH, but can be extended and applied/used in PRACH/SRS/CSI-RS, or the like.

Fourth Embodiment

The fourth embodiment describes a method of defining/prescribing/indicating/configuring a time of performing change/update of uplink/downlink RS/channel Tx/Rx beam.

Methods described below are merely distinguished for convenience of explanation. Thus, it is obvious that configuration of any method can be substituted or combined with configuration of another method.

An application time of the change/update of the uplink/downlink RS/channel Tx/Rx beam through the proposal method of the second embodiment may be defined/prescribed/indicated/configured after [X] msec from transmission of ACK PUCCH for the corresponding PDSCH (Case1).

And/or, an application time of the change/update of the uplink/downlink RS/channel Tx/Rx beam through the proposal method of the third embodiment may be defined/prescribed/indicated/configured after [X] msec from transmission of the corresponding PUSCH (Case2).

And/or, in the MAC-CE based operation according to the second and third embodiments, the application time of the beam change/update may be defined/prescribed/indicated/configured after [X] msec from transmission of the corresponding ACK (Case3).

Here, X may be a fixed value such as 0 or 3, or a value set by the base station.

That is, the proposal method of the fourth embodiment proposes a method/scheme of defining/prescribing/indicating/configuring the time of performing the change/update of the uplink/downlink RS/channel Tx/Rx beam based on the beam linkage state according to the second and third embodiments.

The Case1 may apply the beam change/update method based on the beam linkage state after a specific time [X] msec after sending ACK for the PDSCH. And/or, the [X] value may be a fixed value or may be set by the base station. Since sending the ACK means that a codepoint for the beam linkage state within DCI has been properly decoded, the beam configuration/change/update can be performed as in the above proposal methods without separate signaling.

In the Case2, if the UL DCI is properly decoded, the PUSCH may be transmitted. Therefore, the proposed operation may be defined/prescribed/indicated/configured to be applied after [X] msec based on the corresponding time.

In the Case3, the configuration/change of the beam linkage state via MAC-CE is performed, unlike the DCI based operations of the two Cases. Therefore, applicable (application) timing (e.g., after 3 msec from the ACK transmission) that has been applied to the MAC-CE based update in the existing NR BM may be applied as it is, or may be separately defined/prescribed/indicated/configured to a value after [X] msec.

Fifth Embodiment

The fifth embodiment describes a method of configuring CSI-RS(s) to apply a beam change/update based on a joint TCI state.

Methods described below are merely distinguished for convenience of explanation. Thus, it is obvious that configuration of any method can be substituted or combined with configuration of another method.

Table 14 shows the agreement discussed in RAN1 #104e.

TABLE 14

<Agreement on RAN1#104e>
Agreement
On Rel.17 unified TCI framework, decide by RAN1#104bis-e:
   Whether DL or, if applicable, joint TCI also applies to the following signals. If not, FFS any other
   enhancement over Rel. 15/16:
      o   CSI-RS resources for CSI
      o   Some CSI-RS resources for BM, if so, which ones (e.g. aperiodic, repetition 'ON')
      o   CSI-RS for tracking
   Whether UL or, if applicable, joint TCI also applies to the following signals
      o   Some SRS resources or resource sets for BM As shown in the agreement of Table 14, currently, in Rel-17 multi-beam, channel(s)/RS(s) to which a joint TCI state indication will be applied based on the unified TCI framework are being discussed, and this may be performed through the beam linkage state (BLS) of the present disclosure. For example, Target set B of Table 11 may include CSI-RS. In this instance, beam linkage state #1 may be indicated to the UE, and the UE may change/update a beam of CSI-RS based on a TCI state of the PDSCH.

For example, in a joint TCI state, all beams of DL/UL related target channel(s)/RS(s) may be updated/changed based on the corresponding TCI state indication. Unlike this, in a separate DL/UL TCI state, based on the corresponding TCI state indication, beams of DL related target channel(s)/RS(s) may be updated/changed, or beams of UL related target channel(s)/RS(s) may be updated/changed.

Here, the consideration for CSI-RS may have the following problems when performing the beam change/update through the joint TCI state indication.

First, up to 128 CSI-RSs may be configured to a pool through RRC configuration. This is used for the cell-specific use or is mixed without classification of UE-group/UE-dedicated use. In particular, the configuration of CSI-RS for CSI may be performed through RS ID switching based on a CSI-RS resource indicator (CRI) not UE-dedicated beamforming. Because a plurality of CSI-RSs are present within the corresponding CSI-RS resource set, performing the entire beam change/update operation based on the CSI-RSs in units of set may cause a problem when performing the existing legacy operation.

A specific CSI-RS may be configured to be included in a plurality of CSI-RS resource sets (i.e., CSI-RS sharing), but whether to apply per CSI-RS resource set when performing the beam change/update of the specific CSI-RS according to this may need to be additionally considered.

Accordingly, the present embodiment describes a detailed application method of the joint TCI state for the CSI-RS. That is, according to the present embodiment, a base station may configure specific CSI-RS(s), to which the beam change/update according to the joint TCI state will be applied, as in a method 5-1 and/or a method 5-2.

(Method 5-1) The base station separately configures N specific CSI-RSs in a global pool for the CSI-RS. For example, the global pool may refer to CSI-RS resources configured based on CSI-ResourceConfig IE.

(Method 5-2) The base station configures specific CSI-RS(s) within a CSI-RS resource set for the use of the beam change/update according to the joint TCI state.

As described above, the base station may configure the UE with CSI-RS for applying applicability for performing the beam change/update of the CSI-RS according to the joint TCI state.

As in the method 5-1, the base station may indicate N specific CSI-RSs in a CSI-RS global pool, where N is 1 or 2. Alternatively, the base station may configure to sequentially select and operate the N CSI-RSs based on a first/last index in the CSI-RS global pool.

And/or, as in the method 5-2, the base station may indicate a CSI-RS according to applicability based on a specific RS or an RS corresponding to a first index within the CSI-RS resource set.

In this instance, a specific CSI-RS within the global pool may be configured to be included in a plurality of CSI-RS resource sets. In this case, if a beam of the CSI-RS is changed/updated, the beam change/update may be equally performed on the CSI-RS resource set(s) including the CSI-RS. And/or, the UE may not expect that the CSI-RS to apply the corresponding applicability is configured to be included in the plurality of resource set(s).

FIG. 18 is a flow chart illustrating an operation method of a UE described in the present disclosure.

Referring to FIG. 18, a UE (100/200 of FIGS. 20 to 23) may receive CSI resource configuration related information from a base station (BS), in step S1801.

And/or, the CSI resource configuration related information (e.g., CSI-ResourceConfig IE) may include information for one or more channel state information-reference signal (CSI-RS) resource sets. And/or, at least one CSI-RS resource included in the one or more CSI-RS resource sets may be configured to be applied with a joint transmission configuration indication (TCI) state.

That is, whether to apply a beam change/update based on the joint TCI state may be configured per CSI-RS resource within the CSI-RS resource set. Alternatively, the CSI-RS resource within the CSI-RS resource set may be configured for the use of the beam change/update based on the joint TCI state.

And/or, the content of the fifth embodiment may be applied by supplementing or replacing an operation method of FIG. 18 with respect to the configuration of the CSI-RS resource set/CSI-RS resource.

For example, an operation of the UE to receive the CSI resource configuration related information in the step S1801 may be implemented by a device of FIGS. 20 to 23. For example, referring to FIG. 21, one or more processors 102/202 may control one or more memories 104/204 and/or one or more transceivers 106/206 so as to receive the CSI resource configuration related information.

And/or, the UE (100/200 of FIGS. 20 to 23) may receive, from the BS, mapping information on mapping (or mapping relationship) between the at least one CSI-RS resource and a channel or an RS for the joint TCI state, in step S1802.

And/or, the joint TCI state may be a TCI state applicable to two or more targets. And/or, the joint TCI state may be a TCI state that can be applied to all beams of UL/DL related target channel(s)/RS(s).

For example, the joint TCI state may refer to a TCI state of a channel/RS that is a reference of the first and second embodiments. And/or, the TCI state of the channel or the RS may correspond to the joint TCI state.

In the present disclosure, the 'joint TCI state' may refer to a TCI state that can be applied to two or more (target) channels/RSs, and may be referred to as a 'TCI state'.

And/or, the mapping information may be included in a higher layer signal (e.g., RRC configuration), a medium access control-control element, or downlink control information (DCI). For example, the mapping information may be a beam linkage state (BLS) ID/index (or beam linkage information/beam linkage state information) of the first to fifth embodiments. The detailed description for the BLS may refer to the contents of the first to fifth embodiments.

And/or, the channel may be a physical downlink control channel (PDCCH) or a physical downlink shared channel (PDSCH), and the RS may be a CSI-RS.

For example, an operation of the UE to receive the mapping information in the step S1802 may be implemented by the device of FIGS. 20 to 23. For example, referring to FIG. 21, one or more processors 102/202 may control one or more memories 104/204 and/or one or more transceivers 106/206 so as to receive the mapping information.

And/or, the UE (100/200 of FIGS. 20 to 23) may change a first QCL RS of a TCI state for the at least one CSI-RS resource to a second QCL RS of a TCI state of the channel or the RS, in step S1803. And/or, the first QCL RS or the second QCL RS may be a reference RS related to QCL type D.

For example, the TCI state may be configured as shown in Table 6. And/or, if the reference RS (e.g., referenceSignal of Table 6) of the QCL type D (e.g., typeD of Table 6) of the channel or the RS is NZP-CSI-RS-Resource #1, and the reference RS of the QCL type D of the at least one CSI-RS resource is NZP-CSI-RS-Resource #5, the reference RS of the QCL type D of the at least one CSI-RS resource may be changed/updated from the NZP-CSI-RS-Resource #5 to the NZP-CSI-RS-Resource #1 based on the mapping information.

And/or, based on the channel being the PDSCH, the first QCL RS may be changed to the second QCL RS after a preset time from a transmission time of a physical uplink control channel (PUCCH) including acknowledgement (ACK) information for the PDSCH. For example, the preset time may be a time by a fixed value or a time by a value set by the base station.

And/or, the content of the fourth embodiment may be applied by supplementing or replacing the operation method of FIG. 18 with respect to the beam change/update time.

For example, an operation of the UE to change to the second QCL RS in the step S1803 may be implemented by the device of FIGS. 20 to 23. For example, referring to FIG. 21, one or more processors 102/202 may control one or more memories 104/204 and/or one or more transceivers 106/206 so as to change to the second QCL RS.

And/or, the UE (100/200 of FIGS. 20 to 23) may receive, from the BS, at least one CSI-RS corresponding to the at least one CSI-RS resource based on the second QCL RS, in step S1804. And/or, a port of the at least one CSI-RS may be QCLed (quasi co-located) with the second QCL RS. Alternatively, the port of the at least one CSI-RS may have a QCL relationship with the second QCL RS. Alternatively, the UE/BS may assume that the port of the at least one CSI-RS is QCLed with the second QCL RS.

For example, the UE may receive, from the BS, the at least one CSI-RS corresponding to the at least one CSI-RS resource based on a beam corresponding to the second QCL RS. For example, the UE may receive the at least one CSI-RS based on a spatial domain filter (or beam) applied/used when receiving/transmitting the channel or the RS.

For example, an operation of the UE to receive the at least one CSI-RS in the step S1804 may be implemented by the device of FIGS. 20 to 23. For example, referring to FIG. 21, one or more processors 102/202 may control one or more memories 104/204 and/or one or more transceivers 106/206 so as to receive the at least one CSI-RS.

And/or, the UE (100/200 of FIGS. 20 to 23) may transmit the CSI to the BS based on the at least one CSI-RS, in step S1805.

For example, a transmission operation of the CSI based on the at least one CSI-RS may refer to the content of the CSI related operation described above.

For example, an operation of the UE to transmit the CSI in the step S1805 may be implemented by the device of FIGS. 20 to 23. For example, referring to FIG. 21, one or more processors 102/202 may control one or more memories 104/204 and/or one or more transceivers 106/206 so as to transmit the CSI.

Although the operation method of FIG. 18 has been described based on a downlink channel/RS being a reference channel/RS, it is obvious that an uplink channel/RS can be the reference channel/RS. For example, if the uplink channel/RS is the reference channel/RS, the joint TCI state can be applied by being replaced with spatial relation info (or spatial relation information). And/or, the channel may be a PUSCH or a PUCCH, and the RS may be an SRS. And/or, for a beam of a CSI-RS, a spatial domain Rx filter corresponding to a spatial domain Tx filter based on the spatial relation info of the uplink channel/RS, that is a reference, can be applied.

And/or, a detailed operation/method when the uplink channel/RS is the reference channel/RS may refer to the first and third embodiments.

Since the operation of the UE described with reference to FIG. 18 is the same as the operation of the UE described with reference to FIGS. 1 to 17 (e.g., the first to fifth embodiments), a detailed operation thereof is omitted.

The signaling and the operation described above may be implemented by a device (e.g., FIGS. 20 to 23) to be described below. For example, the signaling and the operation described above may be processed by one or more processors of FIGS. 20 to 23, and the signaling and the operation described above may be stored in a memory in the form of commands/programs (e.g., instructions, executable codes) for running at least one processor of FIGS. 20 to 23.

For example, a processing apparatus configured to control a UE to transmit a CSI in a wireless communication system may comprise at least one processor, and at least one memory operably connected to the at least one processor, wherein the at least one memory may be configured to store instructions performing operations based on being executed by the at least one processor, wherein the operations may comprise receiving CSI resource configuration related information from a base station (BS), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; receiving, from the BS, mapping information on a mapping between the at least one CSI-RS resource and a channel or an RS for the joint TCI state; changing a first QCL RS of a TCI state for the at least one CSI-RS resource to a second QCL RS of a TCI state of the channel or the RS; receiving, from the BS, at least one CSI-RS related to the at least one CSI-RS resource based on the second QCL RS; and transmitting the CSI to the BS based on the at least one CSI-RS.

For example, in a computer readable storage medium storing at least one instruction, the at least one instruction may be configured to allow at least one processor to control operations based on being executed by the at least one processor, and the operations may comprise receiving CSI resource configuration related information from a base station (BS), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; receiving, from the BS, mapping information on a mapping between the at least one CSI-RS resource and a channel or an RS for the joint TCI state; changing a first QCL RS of a TCI state for the at least one CSI-RS resource to a second QCL RS of a TCI state of the channel or the RS; receiving, from the BS, at least one CSI-RS related to the at least one CSI-RS resource based on the second QCL RS; and transmitting the CSI to the BS based on the at least one CSI-RS.

FIG. 19 is a flow chart illustrating an operation method of a base station described in the present disclosure.

Referring to FIG. 19, a base station (BS) (100/200 of FIGS. 20 to 23) may transmit CSI resource configuration related information to a UE, in step S1901.

And/or, the CSI resource configuration related information (e.g., CSI-ResourceConfig IE) may include information for one or more channel state information-reference signal (CSI-RS) resource sets. And/or, at least one CSI-RS resource included in the one or more CSI-RS resource sets may be configured to be applied with a joint transmission configuration indication (TCI) state.

That is, whether to apply a beam change/update based on the joint TCI state may be configured per CSI-RS resource within the CSI-RS resource set. Alternatively, the CSI-RS resource within the CSI-RS resource set may be configured for the use of the beam change/update based on the joint TCI state.

And/or, the content of the fifth embodiment may be applied by supplementing or replacing an operation method of FIG. 19 with respect to the configuration of the CSI-RS resource set/CSI-RS resource.

For example, an operation of the BS to transmit the CSI resource configuration related information in the step S1901 may be implemented by a device of FIGS. 20 to 23. For example, referring to FIG. 21, one or more processors 102/202 may control one or more memories 104/204 and/or one or more transceivers 106/206 so as to transmit the CSI resource configuration related information.

And/or, the BS (100/200 of FIGS. 20 to 23) may transmit, to the UE, mapping information on mapping (or mapping relationship) between the at least one CSI-RS resource and a channel or an RS for the joint TCI state, in step S1902.

And/or, the joint TCI state may be a TCI state applicable to two or more targets. And/or, the joint TCI state may be a TCI state that can be applied to all beams of UL/DL related target channel(s)/RS(s).

For example, the joint TCI state may refer to a TCI state of a channel/RS that is a reference of the first and second embodiments. And/or, the TCI state of the channel or the RS may correspond to the joint TCI state.

In the present disclosure, the 'joint TCI state' may refer to a TCI state that can be applied to two or more (target) channels/RSs, and may be referred to as a 'TCI state'.

And/or, the mapping information may be included in a higher layer signal (e.g., RRC configuration), a medium access control-control element, or downlink control information (DCI). For example, the mapping information may be a beam linkage state (BLS) ID/index (or beam linkage information/beam linkage state information) of the first to fifth embodiments. The detailed description for the BLS may refer to the contents of the first to fifth embodiments.

And/or, the channel may be a physical downlink control channel (PDCCH) or a physical downlink shared channel (PDSCH), and the RS may be a CSI-RS.

And/or, a first QCL RS of a TCI state for the at least one CSI-RS resource may be changed to a second QCL RS of a TCI state of the channel or the RS. And/or, the first QCL RS or the second QCL RS may be a reference RS related to QCL type D.

For example, the TCI state may be configured as shown in Table 6. And/or, if the reference RS (e.g., referenceSignal of Table 6) of the QCL type D (e.g., typeD of Table 6) of the channel or the RS is NZP-CSI-RS-Resource #1, and the reference RS of the QCL type D of the at least one CSI-RS resource is NZP-CSI-RS-Resource #5, the reference RS of the QCL type D of the at least one CSI-RS resource may be changed/updated from the NZP-CSI-RS-Resource #5 to the NZP-CSI-RS-Resource #1 based on the mapping information.

And/or, based on the channel being the PDSCH, the first QCL RS may be changed to the second QCL RS after a preset time from a transmission time of a physical uplink control channel (PUCCH) including acknowledgement (ACK) information for the PDSCH. For example, the preset time may be a time by a fixed value or a time by a value set by the base station.

And/or, the content of the fourth embodiment may be applied by supplementing or replacing the operation method of FIG. 19 with respect to the beam change/update time.

For example, an operation of the BS to transmit the mapping information in the step S1902 may be implemented by the device of FIGS. 20 to 23. For example, referring to FIG. 21, one or more processors 102/202 may control one or more memories 104/204 and/or one or more transceivers 106/206 so as to transmit the mapping information.

And/or, the BS (100/200 of FIGS. 20 to 23) may transmit, to the UE, at least one CSI-RS corresponding to the at least one CSI-RS resource based on the second QCL RS, in step S1903. And/or, a port of the at least one CSI-RS may be QCLed (quasi co-located) with the second QCL RS. Alternatively, the port of the at least one CSI-RS may have a QCL relationship with the second QCL RS. Alternatively, the UE/BS may assume that the port of the at least one CSI-RS is QCLed with the second QCL RS.

For example, the UE may receive, from the BS, the at least one CSI-RS corresponding to the at least one CSI-RS resource based on a beam corresponding to the second QCL RS. For example, the UE may receive the at least one CSI-RS based on a spatial domain filter (or beam) applied/used when receiving/transmitting the channel or the RS.

For example, an operation of the BS to transmit the at least one CSI-RS in the step S1903 may be implemented by the device of FIGS. 20 to 23. For example, referring to FIG. 21, one or more processors 102/202 may control one or more memories 104/204 and/or one or more transceivers 106/206 so as to transmit the at least one CSI-RS.

And/or, the BS (100/200 of FIGS. 20 to 23) may receive the CSI from the UE based on the at least one CSI-RS, in step S1904.

For example, a reception operation of the CSI based on the at least one CSI-RS may refer to the content of the CSI related operation described above.

For example, an operation of the BS to receive the CSI in the step S1904 may be implemented by the device of FIGS. 20 to 23. For example, referring to FIG. 21, one or more processors 102/202 may control one or more memories 104/204 and/or one or more transceivers 106/206 so as to receive the CSI.

Although the operation method of FIG. 19 has been described based on a downlink channel/RS being a reference channel/RS, it is obvious that an uplink channel/RS can be the reference channel/RS. For example, if the uplink channel/RS is the reference channel/RS, the joint TCI state can be applied by being replaced with spatial relation info (or spatial relation information). And/or, the channel may be a PUSCH or a PUCCH, and the RS may be an SRS. And/or, for a beam of a CSI-RS, a spatial domain Rx filter corresponding to a spatial domain Tx filter based on the spatial relation info of the uplink channel/RS, that is a reference, can be applied.

And/or, a detailed operation/method when the uplink channel/RS is the reference channel/RS may refer to the first and third embodiments.

Since the operation of the BS described with reference to FIG. 19 is the same as the operation of the BS described with reference to FIGS. 1 to 18 (e.g., the first to fifth embodiments), a detailed operation thereof is omitted.

The signaling and the operation described above may be implemented by a device (e.g., FIGS. 20 to 23) to be described below. For example, the signaling and the operation described above may be processed by one or more processors of FIGS. 20 to 23, and the signaling and the operation described above may be stored in a memory in the form of commands/programs (e.g., instructions, executable codes) for running at least one processor of FIGS. 20 to 23.

For example, a processing apparatus configured to control a BS to receive a CSI in a wireless communication system may comprise at least one processor, and at least one memory operably connected to the at least one processor, wherein the at least one memory may be configured to store instructions performing operations based on being executed by the at least one processor, wherein the operations may comprise transmitting CSI resource configuration related information to a user equipment (UE), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; transmitting, to the UE, mapping information on a mapping between the at least one CSI-RS resource and a channel or an RS for the joint TCI state, a first QCL RS of a TCI state for the at least one CSI-RS resource being changed to a second QCL RS of a TCI state of the channel or the RS; transmitting, to the UE, at least one CSI-RS related to the at least one CSI-RS resource based on the second QCL RS; and receiving the CSI from the UE based on the at least one CSI-RS.

For example, in a computer readable storage medium storing at least one instruction, the at least one instruction may be configured to allow at least one processor to control operations based on being executed by the at least one processor, and the operations may comprise transmitting CSI resource configuration related information to a user equipment (UE), the CSI resource configuration related information including information for one or more channel state information-reference signal (CSI-RS) resource sets, and at least one CSI-RS resource included in the one or more CSI-RS resource sets being configured to be applied with a joint transmission configuration indication (TCI) state; transmitting, to the UE, mapping information on a mapping between the at least one CSI-RS resource and a channel or an RS for the joint TCI state, a first QCL RS of a TCI state for the at least one CSI-RS resource being changed to a second QCL RS of a TCI state of the channel or the RS; transmitting, to the UE, at least one CSI-RS related to the at least one CSI-RS resource based on the second QCL RS; and receiving the CSI from the UE based on the at least one CSI-RS.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 20 shows a communication system 1 based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device to which the Present Disclosure is Applied

FIG. 21 illustrates wireless devices based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Application Example of Wireless Device to which the Present Disclosure is Applied FIG. 22 illustrates another example of a wireless device based on an embodiment of the present disclosure. The wireless device may be implemented in various forms based on a use-case/service.

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place based on a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Mobile Device to which the Present Disclosure is Applied

FIG. 23 shows a hand-held device based on an embodiment of the present disclosure. The hand-held device may include a smartphone, a smart pad, a wearable device (e.g., a smart watch or a smart glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

A wireless communication technology implemented by a wireless device (e.g., 100, 200) according to the present disclosure may include narrowband Internet of Things for low power communication in addition to LTE, NR and 6G. In this case, for example, the NB-IOT technology may be an example of a low power wide area network (LPWAN) technology and may be implemented by standards such as LTE Cat NB1 and/or LTE Cat NB2, and the present disclosure is not limited to the aforementioned names. Additionally or alternatively, the wireless communication technology implemented by the wireless device (e.g., 100, 200) according to the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the present disclosure is not limited to the aforementioned names. Additionally or alternatively, the wireless communication technology implemented by the wireless device (e.g., 100, 200) according to the present disclosure may include at least one of ZigBee, Bluetooth and a low power wide area network (LPWAN) in which low power communication is considered, and the present disclosure is not limited to the aforementioned names. For example, the ZigBee technology may generate personal area networks (PAN) related to small/low-power digital communication based on various standards such as IEEE 802.15.4, and may be called various names.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of transmitting and receiving a CSI in a wireless communication system according to the present disclosure has been described focusing on examples applying to the 3GPP LTE/LTE-A system and 5G system (new RAT system), the present disclosure can be applied to various wireless communication systems, such as beyond 5G, 6G, and beyond 6G, in addition to the systems described above.

The invention claimed is:

1. A method of transmitting, by a user equipment (UE), channel state information (CSI) in a wireless communication system, the method comprising:

receiving CSI resource configuration related information from a base station (BS), wherein the CSI resource configuration related information includes information for one or more channel state information-reference signal (CSI-RS) resource sets, and at least one CSI-RS resource included in the one or more CSI-RS resource sets is configured to be applied with a joint transmission configuration indication (TCI) state;

receiving, from the BS, mapping information on a mapping between the at least one CSI-RS resource and a channel or an RS for the joint TCI state;

changing a first QCL RS of a TCI state for the at least one CSI-RS resource to a second QCL RS of a TCI state of the channel or the RS;

receiving, from the BS, at least one CSI-RS related to the at least one CSI-RS resource based on the second QCL RS; and transmitting the CSI to the BS based on the at least one CSI-RS, wherein the channel is a physical downlink control channel (PDCCH) or a physical downlink shared channel (PDSCH), and the RS is a CSI-RS, wherein, based on the channel being the PDSCH, the first QCL RS is changed to the second QCL RS after a preset time from a transmission time of a physical uplink control channel (PUCCH) including acknowledgement (ACK) information for the PDSCH.

2. The method of claim 1, wherein the first QCL RS or the second QCL RS is a reference RS related to QCL type D.

3. The method of claim 2, wherein a port of the at least one CSI-RS is QCLed (quasi co-located) with the second QCL RS.

4. The method of claim 1, wherein the joint TCI state is a TCI state applicable to two or more targets.

5. The method of claim 4, wherein the TCI state of the channel or the RS is related to the joint TCI state.

6. The method of claim 1, wherein the mapping information is included in a higher layer signal, a medium access control-control element, or downlink control information (DCI).

7. A user equipment (UE) configured to transmit channel state information (CSI) in a wireless communication system, the UE comprising:

at least one transceiver;

at least one processor; and at least one memory operably connected to the at least one processor, wherein the at least one memory is configured to store instructions performing operations based on being executed by the at least one processor, wherein the operations comprise:

receiving CSI resource configuration related information from a base station (BS), wherein the CSI resource configuration related information includes information for one or more channel state information-reference signal (CSI-RS) resource sets, and at least one CSI-RS resource included in the one or more CSI-RS resource sets is configured to be applied with a joint transmission configuration indication (TCI) state;

receiving, from the BS, mapping information on a mapping between the at least one CSI-RS resource and a channel or an RS for the joint TCI state;

changing a first QCL RS of a TCI state for the at least one CSI-RS resource to a second QCL RS of a TCI state of the channel or the RS;

receiving, from the BS, at least one CSI-RS related to the at least one CSI-RS resource based on the second QCL RS; and transmitting the CSI to the BS based on the at least one CSI-RS, wherein the channel is a physical downlink control channel (PDCCH) or a physical downlink shared channel (PDSCH), and the RS is a CSI-RS, wherein, based on the channel being the PDSCH, the first QCL RS is changed to the second QCL RS after a preset time from a transmission time of a physical uplink control channel (PUCCH) including acknowledgement (ACK) information for the PDSCH.

8. A method of receiving, by a base station (BS), channel state information (CSI) in a wireless communication system, the method comprising:

transmitting CSI resource configuration related information to a user equipment (UE), wherein the CSI resource configuration related information includes information for one or more channel state information-reference signal (CSI-RS) resource sets, and at least one CSI-RS resource included in the one or more CSI-RS resource sets is configured to be applied with a joint transmission configuration indication (TCI) state;

transmitting, to the UE, mapping information on a mapping between the at least one CSI-RS resource and a channel or an RS for the joint TCI state, a first QCL RS of a TCI state for the at least one CSI-RS resource being changed to a second QCL RS of a TCI state of the channel or the RS;

transmitting, to the UE, at least one CSI-RS related to the at least one CSI-RS resource based on the second QCL RS; and receiving the CSI from the UE based on the at least one CSI-RS, wherein the channel is a physical downlink control channel (PDCCH) or a physical downlink shared channel (PDSCH), and the RS is a CSI-RS, wherein, based on the channel being the PDSCH, the first QCL RS is changed to the second QCL RS after a preset time from a transmission time of a physical uplink control channel (PUCCH) including acknowledgement (ACK) information for the PDSCH.

9. The method of claim 8, wherein the first QCL RS or the second QCL RS is a reference RS related to QCL type D.

10. The method of claim 9, wherein a port of the at least one CSI-RS is QCLed (quasi co-located) with the second QCL RS.

11. The method of claim 8, wherein the joint TCI state is a TCI state applicable to two or more targets.

12. The method of claim 11, wherein the TCI state of the channel or the RS is related to the joint TCI state.

13. The method of claim 8, wherein the mapping information is included in a higher layer signal, a medium access control-control element, or downlink control information (DCI).

* * * * *